United States Patent
Bowden et al.

(10) Patent No.: US 12,016,336 B2
(45) Date of Patent: Jun. 25, 2024

(54) COMPOUNDS AND METHODS FOR IMPROVING PLANT GROWTH AND CROP YIELD

(71) Applicant: UNIVERSITY OF IOWA RESEARCH FOUNDATION, Iowa City, IA (US)

(72) Inventors: Ned B. Bowden, Iowa City, IA (US); Justin M. Carter, Iowa City, IA (US); Eric M. Brown, Iowa City, IA (US); Nimesh Ranasinghe, Iowa, IA (US); Arjun Paudel, Iowa City, IA (US); Erin E. Irish, Iowa City, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 0 days.

(21) Appl. No.: 18/115,700

(22) Filed: Feb. 28, 2023

(65) Prior Publication Data
US 2023/0225326 A1    Jul. 20, 2023

Related U.S. Application Data

(63) Continuation of application No. PCT/US2021/048288, filed on Aug. 30, 2021.

(60) Provisional application No. 63/073,338, filed on Sep. 1, 2020.

(51) Int. Cl.
| | |
|---|---|
| *A01N 57/12* | (2006.01) |
| *A01N 57/16* | (2006.01) |
| *A01N 59/02* | (2006.01) |
| *A01P 21/00* | (2006.01) |
| *C07F 9/06* | (2006.01) |
| *C07F 9/6571* | (2006.01) |
| *C07F 9/6578* | (2006.01) |

(52) U.S. Cl.
CPC ............. *A01N 57/12* (2013.01); *A01N 57/16* (2013.01); *A01N 59/02* (2013.01); *A01P 21/00* (2021.08); *C07F 9/06* (2013.01); *C07F 9/657118* (2013.01); *C07F 9/6578* (2013.01)

(58) Field of Classification Search
None
See application file for complete search history.

(56) References Cited

U.S. PATENT DOCUMENTS

| | | | | |
|---|---|---|---|---|
| 4,333,841 A | * | 6/1982 | Schmidt ................. | C07F 9/1651 558/170 |
| 2012/0077677 A1 | * | 3/2012 | Willms ................... | A01N 37/10 548/335.1 |
| 2018/0055045 A1 | * | 3/2018 | Baur ....................... | A01N 25/04 |
| 2018/0325105 A1 | * | 11/2018 | Vadakekuttu ........... | A01N 25/14 |

FOREIGN PATENT DOCUMENTS

| | | | |
|---|---|---|---|
| CN | 108719315 | * | 11/2018 |
| EP | 3560947 A1 | | 10/2019 |
| WO | 2006109028 A1 | | 10/2006 |
| WO | 2012042227 A1 | | 4/2012 |

OTHER PUBLICATIONS

HCAPLUS Abstract 2018:2051252 (2018); abstracting CN 108719315 (2018).*
HCAPLUS Abstract 1963:10140 (1963).*
STN File REG entry for Registry No. 1068-22-0 (date not available).*
Iboyi, J.E. et al., "Defoliants and desiccants," University of Florida, IFAS Extension, askifas, 2021, retrieved from the Internet:<https://edis.ifas.ufl.edu/publication/PI138>.*
The Seed Head Fact Sheet #14, "A three year comparative study of dessicant use on red clover seed crops in the Peace River region," Mar. 2017, retrieved from the Internet:<http://www.peaceforageseed.ca/pdf/SeedHeads/SH_14_Red_Clover&_Dessicants.pdf>.*
"How to Feed the World in 2050", www.fao.org/fileadmin/templates/wsfs/docs/expert_paper/How_to_Feed_the_World_in_2050.pdf, 35 pages (2009).
Alvarez, C , et al., "An O-Acetylserine(thiol) lyase Homolog with L-Cysteine Desulfhydrase Activity Regulates Cysteine Homeostasis in *Arabidopsis*", Plant Physiol 152(2), 656-669 (2010).
Bloem, E , et al., "H2S and COS Gas Exchange of Transgenic Potato Lines with Modified Expression Levels of Enzymes Involved in Sulphur Metabolism", J Agron Crop Sci 197(4), 311-321 (2011).
Brown, E , et al., "Synthesis, Stability, and Kinetics of Hydrogen Sulfide Release of Dithiophosphates", Journal of Agricultural and Food Chemistry 69 (43), 12900-12908 (2021).
Capper, J , "Is the Grass Always Greener? Comparing the Environmental Impact of Conventional, Natural and Grass-Fed Beef Production Systems", Animals 2, 127-143 (2012).
Carter, J , et al., "Characterization of Dialkyldithiophosphates as Slow Hydrogen Sulfide Releasing Chemicals and Their Effect on the Growth of Maize", Journal of Agricultural and Food Chemistry 67 (43), 11883-11892 (2019).
Carter, J , et al., "Improved growth of pea, lettuce, and radish plants using the slow release of hydrogen sulfide from GYY-4137", PLoS One 13 (12), e0208732, 22 pages (2018).

(Continued)

*Primary Examiner* — John Pak
(74) *Attorney, Agent, or Firm* — Viksnins Harris Padys Malen LLP

(57) ABSTRACT

The invention provides a compound of formula I:

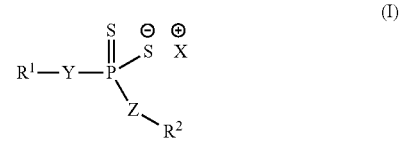

wherein X, Y, Z, $R^1$, $R^2$, and $X^+$ have any of the values described in the specification. The compounds are useful to increase plant growth and/or to increase harvest yield.

18 Claims, 6 Drawing Sheets

(56) References Cited

OTHER PUBLICATIONS

Chen, J, et al., "Hydrogen sulphide enhances photosynthesis through promoting chloroplast biogenesis, photosynthetic enzyme expression, and thiol redox modification in Spinacia oleracea seedlings", J Exp Bot 62(13), 4481-4493 (2011).
Christou, A, et al., "Hydrogen sulfide induces systemic tolerance to salinity and non-ionic osmotic stress in strawberry plants through modification of reactive species biosynthesis and transcriptional regulation of multiple defence pathways", J Exp Bot 64 (7), 1953-1966 (2013).
Database WPI, CN 104030772A, 12 pages, Sep. 10, 2014.
Database WPI, CN106699362A, 7 pages, May 24, 2017.
Database WPI, JP2008136944A, 17 pages, Jun. 19, 2008.
Duan, B, et al., "Improvement of photosynthesis in rice (*Oryza sativa* L.) as a result of an increase in stomatal aperture and density by exogenous hydrogen sulfide treatment", Plant Growth Regul 75, 33-44 (2015).
Fang, T, et al., "Auxin-induced hydrogen sulfide generation is involved in lateral root formation in tomato", Plant Physiol Biochem 76, 44-51 (2014).
Foley, J, et al., "Solutions for a cultivated planet", Nature 478, 337-342 (2011).
Fu, P, et al., "Hydrogen sulfide is involved in the chilling stress response in Vitis vinifera L.", L Acta Soc Bot Pol 82(4), 295-302 (2013).
Gao, S, et al., "Hydrogen Sulfide Delays Postharvest Senescence and Plays an Antioxidative Role in Fresh-cut Kiwifruit", HortScience 48 (11), 1385-1392 (2013).
Garcia-Mata, C, et al., "Hydrogen sulphide, a novel gasotransmitter involved in guard cell signalling", New Phytol 188 (4), 977-984 (2010).
Godfray, H, et al., "Food security: the challenge of feeding 9 billion people", Science 327, 812-818 (2010).
Guo, H, et al., "Hydrogen sulfide: a versatile regulator of environmental stress in plants", Acta Physiologiae Plantarum 38 (16), (2016).
Hou, Z, et al., "Hydrogen Sulfide Regulates Ethylene-induced Stomatal Closure in Arabidopsis thaliana", J Integr Plant Biol 55 (3), 277-289 (2013).
Hu, L, et al., "Hydrogen Sulfide Prolongs Postharvest Shelf Life of Strawberry and Plays an Antioxidative Role in Fruits", J Agric Food Chem 60 (35), 8684-8693 (2012).
Krasensky, J, et al., "Drought, salt, and temperature stress-induced metabolic rearrangements and regulatory networks", J Exp Bot 63 (4), 1593-1608 (2012).
Li, Z, et al., "Hydrogen Sulfide Alleviates Dark-promoted Senescence in Postharvest Broccoli", HortScience 50(3), 416-420 (2015).
Li, S, et al., "Hydrogen Sulfide Alleviates Postharvest Senescence of Broccoli by Modulating Antioxidant Defense and Senescence-Related Gene Expression", J Agric Food Chem 62 (5), 1119-1129 (2014).
Li, Z, et al., "Hydrogen sulfide donor sodium hydrosulfide-improved heat tolerance in maize and involvement of proline", J Plant Phys 170, 741-747 (2013).
Li, Z, et al., "Hydrogen sulfide is a mediator in H2O2-induced seed germination in Jatropha Curcas", Acta Physiol Plant 34 (6), 2207-2213 (2012).
Li, Z, "Hydrogen sulfide: A multifunctional gaseous molecule in plants", Russian J Plant Phys 60, 733-740 (2013).
Lin, Y, et al., "Haem Oxygenase-1 is Involved in Hydrogen Sulfide-induced Cucumber Adventitious Root Formation", J Plant Growth Regul 31 (4), 519-528 (2012).
Liu, J, et al., "Hydrogen sulfide induced by nitric oxide mediates ethylene-induced stomatal closure of *Arabidopsis thaliana*", Chin Sci Bull 56 (33), 3547-3553 (2011).
Miyamoto, T, et al., "Reaction of Phosphinyl and Phosphinothioyl Disulfides with Diazomethane", Agricultural and Biological Chemistry 44 (11), 2581-2586 (1980).
Papenbrock, J, et al., "Characterization of cysteine-degrading and H2S-releasing enzymes of higher plants—from the field to the test tube and back", Plant Biol 9 (5), 582-588 (2007).
Patent Cooperation Treaty, International Search Report and Written Opinion for PCT/US2021/048288, 16 pages, dated Feb. 4, 2022.
Shi, H, et al., "Modulation of auxin content in *Arabidopsis* confers improved drought stress resistance", Plant Physiol Biochem 74, 99-107 (2014).
Sun, Y, et al., "Effects of exogenous hydrogen sulphide on the seed germination of pumpkin under NaCl stress", J Food, Agric Environ 11 (3/4), 1097-1100 (2013).
Wang, B, et al., "Boron toxicity is alleviated by hydrogen sulfide in cucumber (*Cucumis sativus* L.) seedlings", Planta 231 (6), 1301-1309 (2010).
Yadav, S, et al., "Heavy metals toxicity in plants: An overview on the role of glutathione and phytochelatins in heavy metal stress tolerance of plants", S Afr J Bot 76 (2), 167-179 (2010).
Zhang, H, et al., "Hydrogen sulfide acts as a regulator of flower senescence in plants", Postharvest Biol Technol 60 (3), 251-257 (2011).
Zhang, H, et al., "Hydrogen sulfide counteracts chlorophyll loss in sweetpotato seedling leaves and alleviates oxidative damage against osmotic stress", Plant Growth Regul 58 (3), 243-250 (2009).
Zhang, H, et al., "Hydrogen Sulfide Promotes Root Organogenesis in Ipomoea batatas, Salix matsudana and Glycine max", J Integr Plant Biol 51 (12), 1086-1094 (2009).
U.S. Appl. No. 18/024,034.

\* cited by examiner

COMPOUNDS AND METHODS FOR IMPROVING PLANT GROWTH AND CROP YIELD

CROSS-REFERENCE TO RELATED APPLICATION

This application is a continuation of International Patent Application Number PCT/US2021/048288 that was filed on Aug. 30, 2021, and claims priority to U.S. Provisional Application No. 63/073,338 that was filed on Sep. 1, 2020. The entire content of the applications referenced above is hereby incorporated by reference herein.

GOVERNMENT FUNDING

This invention was made with government support under 2018-67030-27352 awarded by the United States Department of Agriculture and under PFI1827336 awarded by the National Science Foundation. The government has certain rights in this invention.

BACKGROUND

The worldwide population is expected to grow from its current level of 7.2B to 9.6B people by 2050 (United Nations, Department of Economic and Social Affairs, Population Division (2013). World Population Prospects: The 2012 Revision, Highlights and Advance Tables. Working Paper No. ESA/P/WP.228; Foley J A, et al., Nature 2011; 478:337-42; and Godfray HCJB, et al., Science. 2010; 327:812-8). To meet the needs of the world's growing human population, it is projected that global food production must increase 70% by 2050 (www.fao.org/fileadmin/templates/wsfs/docs/expertpaper/How_to_Feed_the_World_in_2050.pdf). Aside from sheer population numbers, there are additional factors that will increase market demand for food production. Trends indicate that as developing countries urbanize and their economies grow, their consumption of meat and dairy products will also increase. Because the conversion of feed to livestock is inefficient (for instance, each pound of hamburger requires 52 pounds of feed grain over a cow's lifetime; Capper J L., Animals. 2012; 2:127-43) growth in this sector creates an increasing demand for cereal crops. Biofuel production may drive cereal demands even higher. Yet the amount of land dedicated to farming has remained at 1992 levels both in the United States and worldwide, which has led to a decrease in agricultural area per capita from 0.44 hectares per capita in 1960 to 0.17 hectares per capita in 2025. Current advances in technology cannot increase the yield per acre of crops enough to feed the growing population; new innovations are needed. Solutions must be environmentally safe, nonpolluting, and should help crops survive droughts and other environmental stressors that affect their growth.

One partial solution to this problem is the application of hydrogen sulfide ($H_2S$) to increase the growth, survival, and yields of crops. $H_2S$ is a gasotransmitter that is synthesized enzymatically in plants and used as a signaling molecule. Research in the last dozen years has repeatedly demonstrated that therapeutic amounts of $H_2S$ have dramatic effects, including increased growth of roots, protection against heat stress and drought conditions, increased overall size and mass, alleviation from freezing stress on leaves, protection from high water salinity, and prolonged fruit shelf life (Guo H, et al., Acta Physiol Plant. 2016; 38(1):1-13; Shi H, et al., Plant Phys Biochem. 2013; 71:226-34; Hu L-Y, et al., J Agric Food Sci. 2012; 60:8684-93; Li Z-R, et al., HortScience. 2015; 50(3):416-20; Li Y-J, et al., J Agric Food Chem. 2014; 62:1119-29; and Christou A, et al., J Exper Botany. 2013; 64(7):1953-66). Two of the challenges of working with $H_2S$ is that it is a low boiling point gas (boiling point=−60° C.), and it is highly toxic. Exposure to levels of 2 ppm of $H_2S$ in the air can lead to negative health effects such as headaches or breathing problems for people who suffer from asthma, and exposure to 100 ppm is "immediately dangerous to life and health" (www.osha.gov/SLTC/hydrogensulfide/hazards.html).

The investigation of $H_2S$ in plants is a new field— much of the key work has been completed since 2007—yet it has already been shown to have positive effects on corn, soybeans, wheat, sweet potatoes, cucumbers, strawberries, rice, spinach, tomatoes, broccoli, and kiwi (Duan B, et al., Plant Growth Regul. 2015; 75:33-44; Li Z-G, et al., J Plant Phys. 2013; 170:741-7; Li Z G. Russian J Plant Phys. 2013; 60:733-40; Alvarez C, et al., Arabidopsis. Plant Physiol. 2010; 152(2):656-69; Bloem E, et al., J Agron Crop Sci. 2011; 197(4):311-21; Chen J, et al., J Exp Bot. 2011; 62(13):4481-93; Christou A, et al., J Exp Bot. 2013; 64(7): 1953-66; Fang T, et al., Plant Physiol Biochem. 2014; 76:44-51; Fu P, et al., L. Acta Soc Bot Pol. 2013; 82(4): 295-302; Gao S-P, et al., HortScience. 2013; 48(11):1385-92; Garcia-Mata C, et al., New Phytol. 2010; 188(4):977-84; Hou Z, et al., J Integr Plant Biol. 2013; 55(3):277-89; Hu L-Y, et al., J Agric Food Chem. 2012; 60(35):8684-93; Krasensky J, et al., J Exp Bot. 2012; 63(4):1593-608; Li S-P, et al., J Agric Food Chem. 2014; 62(5):1119-29; Li Z-G, et al., Acta Physiol Plant. 2012; 34(6):2207-13; Lin Y-T, et al., J Plant Growth Regul. 2012; 31(4):519-28; Liu J, et al., Chin Sci Bull. 2011; 56(33):3547-53; Papenbrock J, et al., Plant Biol. 2007; 9(5):582-8; Shi H, et al., Plant Physiol Biochem. 2014; 74:99-107; Sun Y, et al., J Food, Agric Environ. 2013; 11(3 & 4, Pt. 2):1097-100; Wang B-L, et al., Planta. 2010; 231(6):1301-9; Yadav S K. S Afr J Bot. 2010; 76(2):167-79; Zhang H, et al., Postharvest Biol Technol. 2011; 60(3):251-7; Zhang H, et al., J Integr Plant Biol. 2009; 51(12):1086-94; and Zhang H, et al., Plant Growth Regul. 2009; 58(3):243-50).

Carter et al. have shown that the compound GYY-4137, which slowly releases $H_2S$ by hydrolysis, increased the growth of radish, peas, and lettuce plants and that the harvest yield of radishes doubled when milligram loadings of GYY-4137 were applied (Carter J M, et al., PLoS ONE 13(12): e0208732; doi.org/10.1371/journal.pone.0208732).

Most chemicals used to deliver $H_2S$ also release chemicals with $H_2S$ that are not naturally found in the environment. These other chemicals may be toxic, or their safety to animals, bacteria, fungus, or people is not known. This is a critical problem because it limits the application of $H_2S$ in agriculture because these other chemicals will pollute the environment and may present health hazards.

It is strongly desired to have chemicals that will degrade to release $H_2S$ and safe, nontoxic chemicals. Furthermore, it is critical that the rate of release of $H_2S$ be controlled. Different plants may need $H_2S$ delivered to them at different points in their growing cycles which requires the ability to optimize the rate of release of $H_2S$. In addition, it may be beneficial to ensure that all $H_2S$ is released within a particular time period to optimize the growth and harvest yields of plants or to ensure that these chemicals are not present in subsequent growing seasons.

There is currently a need for compounds and methods that are useful to increase the growth and harvest yields of crops.

In particular, there is a need for compounds that have controllable release rates of $H_2S$, and for $H_2S$ releasing compounds that degrade to release safe, biocompatible chemicals.

SUMMARY

The invention provides dithiophosphates that increase the growth and harvest yields of crops. The compounds of the invention were found to increase the harvest yields of peas by over 30%, the harvest weight of lettuce by 20%, the harvest yield of soybeans by 4.4%, and the harvest yield of corn by 6.4%. The $H_2S$ release rate of the dithiophosphates can be tailored to target each type of plant separately if needed. Additionally, the dithiophosphates degrade to release safe, biocompatible chemicals.

In one aspect the present invention provides a compound of the invention, which is a compound of formula I:

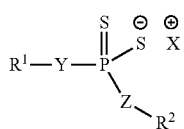

(I)

wherein:
Y is O or S;
Z is O or S;
$R^1$ is $(C_1\text{-}C_{20})$alkyl, phenyl, or $(C_3\text{-}C_{20})$cycloalkyl; and $R^2$ is $(C_1\text{-}C_{20})$alkyl, phenyl, or $(C_3\text{-}C_{20})$cycloalkyl; or $R^1$ and $R^2$ taken together with the atoms to which they are attached form a 5-15 membered heterocyclic ring that is optionally substituted with one or more groups independently selected from the group consisting of $(C_1\text{-}C_6)$alkyl, $(C_3\text{-}C_6)$cycloalkyl, and phenyl, wherein any phenyl or cycloalkyl of $R^1$ and $R^2$ is optionally substituted with one or more groups independently selected from the group consisting of $(C_1\text{-}C_6)$alkyl, $(C_3\text{-}C_6)$cycloalkyl, and phenyl; and
$X^+$ is a suitable cation.

The invention also provides a composition comprising a compound of of formula I and a suitable agricultural carrier.

The invention also provides a method for increasing growth or harvest yield of a plant comprising, providing $H_2S$ to the plant through degradation of a compound of formula I. The $H_2S$ can be provided to the plant by contacting a seed of the plant with the compound of of formula I, contacting the plant with the compound of of formula I, contacting soil on or around the seed or plant with the compound of of formula I, or by placing a container comprising the compound of of formula I proximal to the plant or the seed, so that $H_2S$ is provided to the plant or the seed. In one embodiment, the invention provides a method comprising, degrading a compound of formula I to provide $H_2S$. In one embodiment, the invention provides a method comprising, providing $H_2S$ to a plant or a seed by degrading a compound of formula I. In one embodiment, the invention provides a method comprising, increasing growth or harvest yield by providing $H_2S$ to a plant or a seed through degradation of a compound of formula I.

The invention also provides a method for increasing growth of a plant comprising contacting the plant with a compound of of formula I.

The invention also provides a method for increasing growth of a plant that grows from a seed comprising contacting the seed with a compound of of formula I prior to planting.

The invention also provides a method for increasing growth of a seedling comprising contacting the seedling with a compound of of formula I.

The invention also provides a method for increasing growth of plants when the compound of formula I is not in contact with the seeds or plants but release low levels of hydrogen sulfide.

The invention also provides a method for increasing growth of a plant in soil comprising applying a compound of of formula I to the soil.

The invention also provides a method for increasing harvest yield of a plant comprising contacting the plant with a compound of of formula I.

The invention also provides a method for increasing harvest yield of a plant that grows from a seed comprising contacting the seed with a compound of of formula I prior to planting.

The invention also provides a method for increasing harvest yield of a seedling comprising contacting the seedling with a compound of of formula I.

The invention also provides a method for increasing harvest yield of a plant in soil comprising applying a compound of of formula I.

The invention also provides a method for increasing harvest yield of plants when the compound of of formula I is not in contact with the seeds or plants but release low levels of hydrogen sulfide.

The invention also provides a composition for releasing $H_2S$ following application to a seed, plant, or soil, comprising a compound of formula I.

The invention also provides a kit comprising a compound of formula I, packaging material, and instructions for applying the compound of formula I to release $H_2S$ to soil, a seed, or a plant for increasing the growth or harvest yield of a plant.

DETAILED DESCRIPTION

Figures 1A, 1B:
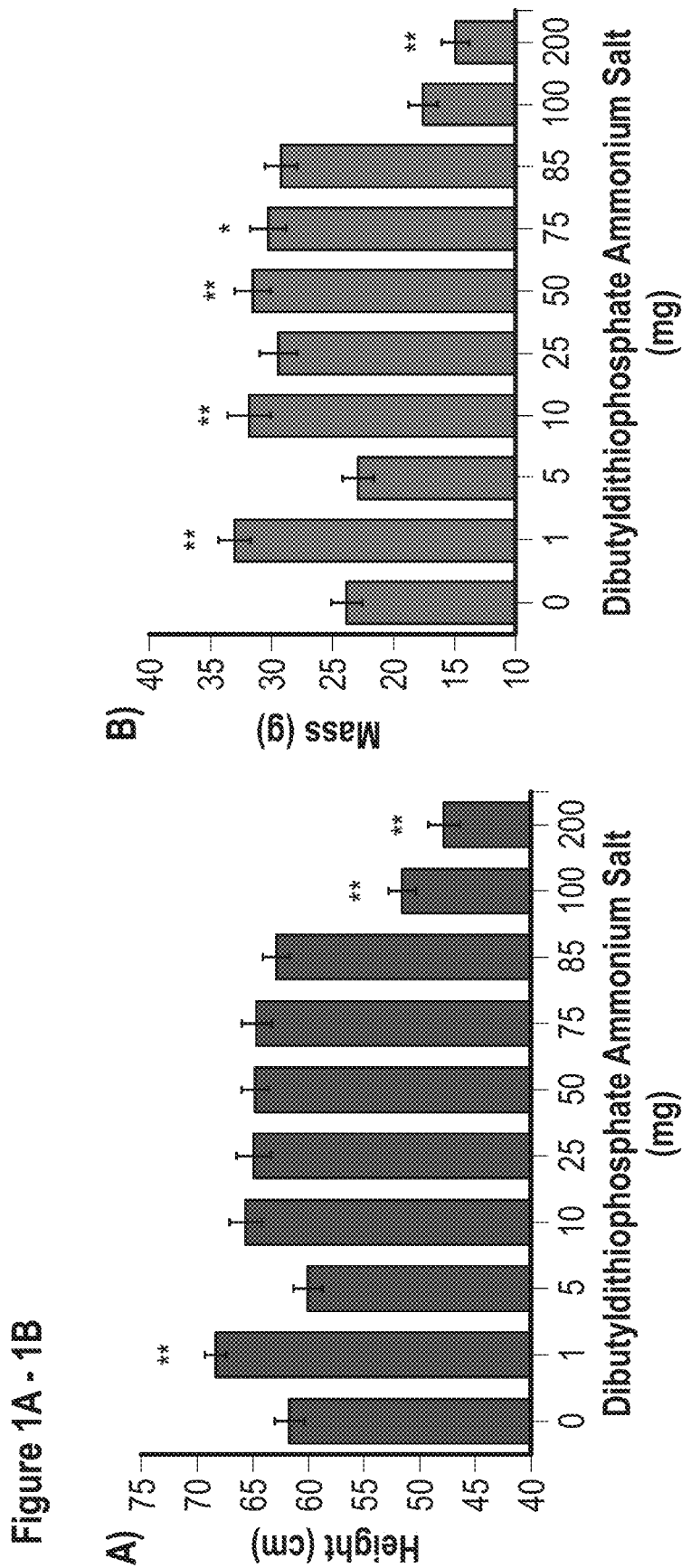
FIGS. 1A-1B show the average A) heights and B) mass of corn plants grown with different loadings of dibutyldithiophosphate ammonium salt added near the seeds and then watered with tap water for 4 weeks (see Example 20). Error bars=+/−1 SE. Groups labeled with a unique number are statistically significant via the Tukey HSD test with a<0.05.

The following definitions are used, unless otherwise described: halo or halogen is fluoro, chloro, bromo, or iodo.

Alkyl, alkoxy, etc. denote both straight and branched groups; but reference to an individual radical such as propyl embraces only the straight chain radical, a branched chain isomer such as isopropyl being specifically referred to.

The term "alkyl", by itself or as part of another substituent, means, unless otherwise stated, a straight or branched chain hydrocarbon radical, having the number of carbon atoms designated (i.e., $C_{1-8}$ means one to eight carbons). Examples include ($C_1$-$C_8$)alkyl, ($C_2$-$C_8$)alkyl, $C_1$-$C_6$)alkyl, ($C_2$-$C_6$)alkyl and ($C_3$-$C_6$)alkyl. Examples of alkyl groups include methyl, ethyl, n-propyl, iso-propyl, n-butyl, t-butyl, iso-butyl, sec-butyl, n-pentyl, n-hexyl, n-heptyl, n-octyl, and and higher homologs and isomers.

The term "cycloalkyl" refers to a saturated or partially unsaturated (non-aromatic) all carbon ring having 3 to 8 carbon atoms (i.e., ($C_3$-$C_8$)carbocycle). The term also includes multiple condensed, saturated all carbon ring systems (e.g., ring systems comprising 2, 3 or 4 carbocyclic rings). Accordingly, carbocycle includes multicyclic carbocyles such as a bicyclic carbocycles (e.g., bicyclic carbocycles having about 3 to 15 carbon atoms, about 6 to 15 carbon atoms, or 6 to 12 carbon atoms such as bicyclo[3.1.0]hexane and bicyclo[2.1.1]hexane), and polycyclic carbocycles (e.g tricyclic and tetracyclic carbocycles with up to about 20 carbon atoms). The rings of the multiple condensed ring system can be connected to each other via fused, spiro and bridged bonds when allowed by valency requirements. For example, multicyclic carbocycles can be connected to each other via a single carbon atom to form a spiro connection (e.g., spiropentane, spiro[4,5]decane, etc), via two adjacent carbon atoms to form a fused connection (e.g., carbocycles such as decahydronaphthalene, norsabinane, norcarane) or via two non-adjacent carbon atoms to form a bridged connection (e.g., norbornane, bicyclo[2.2.2]octane, etc). Non-limiting examples of cycloalkyls include cyclopropyl, cyclobutyl, cyclopentyl, cyclohexyl, bicyclo[2.2.1]heptane, pinane, and adamantane.

The term "heterocyclic ring" refers to a single saturated or partially unsaturated ring that has at least one atom other than carbon in the ring, wherein the atom is selected from the group consisting of oxygen, nitrogen and sulfur; the term also includes multiple condensed ring systems that have at least one such saturated or partially unsaturated ring, which multiple condensed ring systems are further described below. Thus, the term includes single saturated or partially unsaturated rings (e.g., 3, 4, 5, 6 or 7-membered rings) from about 1 to 6 carbon atoms and from about 1 to 3 heteroatoms selected from the group consisting of oxygen, nitrogen and sulfur in the ring. The sulfur and nitrogen atoms may also be present in their oxidized forms.

As used herein, the term "heteroatom" is meant to include oxygen (O), nitrogen (N), sulfur (S) and silicon (Si).

As used herein a wavy line " ∿ " that intersects a bond in a chemical structure indicates the point of attachment of the bond that the wavy bond intersects in the chemical structure to the remainder of a molecule.

The phrase "increase the growth of a plant" includes increasing the mass of the plant or the height of the plant. In one embodiment, the mass of the plant is increased by at least about 5%. In another embodiment, the mass of the plant is increased by at least about 10%. In another embodiment, the mass of the plant is increased by at least about 20%. In one embodiment, the height of the plant is increased by at least about 5%. In another embodiment, the height of the plant is increased by at least about 10%. In another embodiment, the height of the plant is increased by at least about 20%.

The phrase "increase the harvest yield of a plant" includes increasing the yield (e.g. volume or mass) of the harvested material from a plant. In one embodiment, the harvest yield of the plant is increased by at least about 1%. In another embodiment, the harvest yield of the plant is increased by at least about 3%. In another embodiment, the harvest yield of the plant is increased by at least about 10%. In another embodiment, the harvest yield of the plant is increased by at least about 20%.

The phrase "providing $H_2S$ to a plant" includes providing $H_2S$ so that it contacts the plant as well as providing $H_2S$ so that it contacts a seed of the plant.

The compounds disclosed herein can exist as tautomeric isomers in certain cases. Although only one delocalized resonance structure may be depicted, all such forms are contemplated within the scope of the invention.

Stereochemical definitions and conventions used herein generally follow S. P. Parker, Ed., McGraw-Hill Dictionary of Chemical Terms (1984) McGraw-Hill Book Company, New York; and Eliel, E. and Wilen, S., "Stereochemistry of Organic Compounds", John Wiley & Sons, Inc., New York, 1994. The compounds of the invention can contain asymmetric or chiral centers, and therefore exist in different stereoisomeric forms. It is intended that all stereoisomeric forms of the compounds of the invention, including but not limited to, diastereomers, enantiomers and atropisomers, as well as mixtures thereof such as racemic mixtures, form part of the present invention. Many organic compounds exist in optically active forms, i.e., they have the ability to rotate the plane of plane-polarized light. In describing an optically active compound, the prefixes D and L, or R and S, are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. For a given chemical structure, these stereoisomers are identical except that they are mirror images of one another. A specific stereoisomer can also be referred to as an enantiomer, and a mixture of such isomers is often called an enantiomeric mixture. A 50:50 mixture of enantiomers is referred to as a racemic mixture or a racemate, which can occur where there has been no stereoselection or stereospecificity in a chemical reaction or process. The terms "racemic mixture" and "racemate" refer to an equimolar mixture of two enantiomeric species, devoid of optical activity.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase.

When a bond in a compound formula herein is drawn in a non-stereochemical manner (e.g. flat), the atom to which the bond is attached includes all stereochemical possibilities. When a bond in a compound formula herein is drawn in a defined stereochemical manner (e.g. bold, bold-wedge, dashed or dashed-wedge), it is to be understood that the atom to which the stereochemical bond is attached is enriched in the absolute stereoisomer depicted unless otherwise noted. In one embodiment, the compound may be at least 51% the absolute stereoisomer depicted. In another embodiment, the compound may be at least 60% the absolute stereoisomer depicted. In another embodiment, the compound may be at least 80% the absolute stereoisomer depicted. In another embodiment, the compound may be at least 90% the absolute stereoisomer depicted. In another embodiment, the compound may be at least 95 the absolute stereoisomer depicted. In another embodiment, the compound may be at least 99% the absolute stereoisomer depicted.

The compounds may optionally be delivered with other fertilizers, pesticides, and/or herbicides. Alternatively, they may be delivered with water or as a neat solid or solution. The compounds may be sprayed into soil at time of planting, sprayed into soil at intervals post emergence, or sprayed on the foilage of a plant. The compounds may be dripped into soil at time of planting, dripped into soil at intervals post emergence, or dripped on the foilage of a plant. The compounds may be delivered with drip flow or other irrigation methods. In addition the compounds may be applied to seeds prior to planting using established methods. For example, they may be coated on seeds with an inert vehicle, tumbled, and dried.

The compounds can be formulated in a variety of ways. For example, they can be formulated as a dustable powder, gel, a wettable powder, a water dispersible granule, a water-dispersable or water-foaming tablet, a briquette, an emulsifiable concentrate, a microemulsifiable concentrate, an oil-in-water emulsion, a water-in-oil emulsion, a dispersion in water, a dispersion in oil, a suspoemulsion, a soluble liquid (with either water or an organic solvent as the carrier), an impregnated polymer film, or other forms known in the art. These formulations may be suitable for direct application or may be suitable for dilution prior to application, said dilution being made either with water, liquid fertilizer, micronutrients, biological organisms, oil or solvent. The compositions are prepared by admixing the active ingredient with adjuvants including diluents, extenders, carriers, and conditioning agents to provide compositions in the form of finely-divided particulate solids, granules, pellets, solutions, dispersions or emulsions. Thus, it is believed that the active ingredient could be used with an adjuvant such as a finely-divided solid, a mineral oil, a liquid of organic origin, water, various surface active agents or any suitable combination of these.

The active ingredient may also be contained in very fine microcapsules in polymeric substances. Microcapsules typically contain the active material enclosed in an inert porous shell which allows escape of the enclosed material to the surrounds at controlled rates. Encapsulated droplets are typically about 0.1 to 500 microns in diameter. The enclosed material typically constitutes about 25 to 95% of the weight of the capsule. The active ingredient may be present as a monolithic solid, as finely dispersed solid particles in either a solid or a liquid, or it may be present as a solution in a suitable solvent. Shell membrane materials include natural and synthetic rubbers, cellulosic materials, styrene-butadiene copolymers, polyacrylonitriles, polyacrylates, polyesters, polyamides, polyureas, polyurethanes, natural polymers, other polymers familiar to one skilled in the art, chemically-modified polymers and starch xanthates. Alternative very fine microcapsules may be formed wherein the active ingredient is dispersed as finely divided particles within a matrix of solid material, but no shell wall surrounds the microcapsule.

Suitable agricultural adjuvants and carriers that are useful in preparing the compositions of the invention are well known to those skilled in the art.

Liquid carriers that can be employed include water, toluene, xylene, petroleum naphtha, crop oil, acetone, methyl ethyl ketone, cyclohexanone, acetic anhydride, acetonitrile, acetophenone, amyl acetate, 2-butanone, chlorobenzene, cyclohexane, cyclohexanol, alkyl acetates, diacetonalcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethyl formamide, dimethyl sulfoxide, 1,4-dioxane, dipropylene glycol, dipropylene glycol methyl ether, dipropyleneglycol dibenzoate, diproxitol, alkyl pyrrolidinone, ethyl acetate, 2-ethyl hexanol, ethylene carbonate, 1,1,1-trichloroethane, 2-heptanone, alpha pinene, d-limonene, ethylene glycol, ethylene glycol butyl ether, ethylene glycol methyl ether, gamma-butyrolactone, glycerol, glycerol diacetate, glycerol monoacetate, glycerol triacetate, glycerol triacetate, hexadecane, hexylene glycol, isoamyl acetate, isobornyl acetate, isooctane, isophorone, isopropyl benzene, isopropyl myristate, lactic acid, laurylamine, mesityl oxide, methoxy-propanol, methyl isoamyl ketone, methyl isobutyl ketone, methyl laurate, methyl octanoate, methyl oleate, methylene chloride, m-xylene, n-hexane, n-octylamine, octyl amine acetate, oleylamine, o-xylene, phenol, polyethylene glycol (PEG400), propionic acid, propylene glycol, propylene glycol monomethyl ether, propylene glycol mono-methyl ether, p-xylene, toluene, triethyl phosphate, triethylene glycol, xylene sulfonic acid, trichloroethylene, perchloroethylene, ethyl acetate, amyl acetate, butyl acetate, propylene glycol monomethyl ether and diethylene glycol monomethyl ether, methanol, ethanol, isopropanol, and higher molecular weight alcohols such as amyl alcohol, tetrahydrofurfuryl alcohol, hexanol, octanol, etc., ethylene glycol, propylene glycol, glycerine, N-methyl-2-pyrrolidinone, and the like. Water is generally the carrier of choice for the dilution of concentrates.

Suitable solid carriers include talc, titanium dioxide, pyrophyllite clay, silica, attapulgite clay, kieselguhr, chalk, diatomaceous earth, lime, calcium carbonate, bentonite clay, Fuller's earth, cotton seed hulls, wheat flour, soybean flour, pumice, wood flour, walnut shell flour, lignin, and the like such as described in the CFR 180.1001. (c) & (d).

A broad range of surface-active agents can be employed in both solid and liquid compositions, especially those designed to be diluted with carrier before application. Suitable surface-active compounds are nonionic, cationic and/or anionic surfactants and surfactant mixtures having good emulsifying, dispersing and wetting properties. Examples of suitable surfactants and surfactant mixtures are given in U.S. Pat. Nos. 5,958,835; 6,063,732 and 6,165,939. Also the surfactants customarily used for the art of formulation and described, inter alia, in "McCutcheon's Detergents and Emulsifiers Annual" MC Publishing Corp., Ridgewood N.J., 1981, Stache, H., "Tensid-Taschenbuch" (Handbook of Surfactants), Carl Hanser Verlag, Munich/Vienna, 1981, and M. and J. Ash, "Encyclopedia of Surfactants", Vol I-III, Chemical Publishing Co., New York, 1980-81 are suitable for manufacture of the herbicides according to the invention.

The formulations of the invention can comprise the compounds in any suitable concentration. In one embodiment, for example, the formulation may include the compound in about 95, 90, 80, 60, 50, 40, 30, 20, 10, 5, 2, 1, 0.5 or 0.01 weight percent of the formulation. The formulations may also include other fertilizers or pesticides, which may also be present in any suitable concentration.

The compounds can be applied to soil or plants at any acceptable rate. For example, the compounds can be applied at a rate of at least about 1 kg per acre, at least about 2 kg per acre, at least about 5 kg per acre, at least about 10 kg per acre, or at least about 20 kg per acre, although higher application rates are not excluded.

In one embodiment, the compound can be dissolved in water, organic solvents, or a mixture thereof, without other fertlizers, pesticides, herbicides, or other chemicals in a concentration of from about 2% weight percent of the formulation to about 90% weight percent of the formulation. In another embodiment, the compound can be dissolved in water, organic solvents, or a mixture thereof, without other fertlizers, pesticides, herbicides, or other chemicals in a concentration of from about 20% weight percent of the formulation to about 80% weight percent of the formulation.

In another embodiment, the formulation comprises the compound dissolved in water, organic solvents, or a mixture thereof, with other fertlizers, pesticides, herbicides, or other chemicals present, wherein the compound is present in less than 5% weight percent of the formulation. In another embodiment, the formulation comprises the compound dissolved in water, organic solvents, or a mixture thereof, with other fertlizers, pesticides, herbicides, or other chemicals present, wherein the compound is present in less than 1% weight percent of the formulation.

Specific values listed below for radicals, substituents, and ranges, are for illustration only; they do not exclude other defined values or other values within defined ranges for the radicals and substituents. It is to be understood that two or more values may be combined. It is also to be understood that the values listed herein below (or subsets thereof) can be excluded.

Specifically, $(C_1\text{-}C_{20})$alkyl can be methyl, ethyl, propyl, isopropyl, butyl, iso-butyl, sec-butyl, pentyl, 3-pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl; and $(C_3\text{-}C_{20})$cycloalkyl can be cyclopropyl, cyclobutyl, cyclopentyl, or cyclohexyl.

A specific value for Y is O.
A specific value for Y is S.
A specific value for Z is O.
A specific value for Z is S.
A specific value for $R^1$ is $(C_1\text{-}C_{20})$alkyl.
A specific value for $R^1$ is $(C_1\text{-}C_{15})$alkyl.
A specific value for $R^1$ is $(C_1\text{-}C_{10})$alkyl.
A specific value for $R^1$ is $(C_5\text{-}C_{20})$alkyl.
A specific value for $R^1$ is $(C_5\text{-}C_{15})$alkyl.
A specific value for $R^1$ is $(C_5\text{-}C_{10})$alkyl.
A specific value for $R^1$ is $C_2$-alkyl, $C_3$-alkyl, $C_4$-alkyl, $C_5$-alkyl, $C_6$-alkyl, $C_7$-alkyl, $C_8$-alkyl, $C_9$-alkyl, $C_{10}$-alkyl, $C_{11}$-alkyl, $C_{12}$-alkyl, $C_{13}$-alkyl, $C_{14}$-alkyl, $C_{15}$-alkyl, $C_{16}$-alkyl, $C_{17}$-alkyl, $C_{18}$-alkyl, $C_{19}$-alkyl, or $C_{20}$-alkyl.

A specific value for $R^1$ is phenyl that is optionally substituted with one or more groups independently selected from the group consisting of $(C_1\text{-}C_6)$alkyl, $(C_3\text{-}C_6)$cycloalkyl, and phenyl.

A specific value for $R^1$ is $(C_3\text{-}C_{20})$cycloalkyl that is optionally substituted with one or more groups independently selected from the group consisting of $(C_1\text{-}C_6)$alkyl, $(C_3\text{-}C_6)$cycloalkyl, and phenyl.

A specific value for $R^1$ is $(C_3\text{-}C_{15})$cycloalkyl.
A specific value for $R^1$ is $(C_3\text{-}C_{10})$cycloalkyl.
A specific value for $R^1$ is $(C_3\text{-}C_6)$cycloalkyl.
A specific value for $R^1$ is $(C_6\text{-}C_{10})$cycloalkyl.
A specific value for $R^2$ is $(C_1\text{-}C_{20})$alkyl.
A specific value for $R^2$ is $(C_1\text{-}C_{15})$alkyl.
A specific value for $R^2$ is $(C_1\text{-}C_{10})$alkyl.
A specific value for $R^2$ is $(C_5\text{-}C_{20})$alkyl.
A specific value for $R^2$ is $(C_5\text{-}C_{15})$alkyl.
A specific value for $R^2$ is $(C_5\text{-}C_{10})$alkyl.
A specific value for $R^2$ is $C_2$-alkyl, $C_3$-alkyl, $C_4$-alkyl, $C_5$-alkyl, $C_6$-alkyl, $C_7$-alkyl, $C_8$-alkyl, $C_9$-alkyl, $C_{10}$-alkyl, $C_{11}$-alkyl, $C_{12}$-alkyl, $C_{13}$-alkyl, $C_{14}$-alkyl, $C_{15}$-alkyl, $C_{16}$-alkyl, $C_{17}$-alkyl, $C_{18}$-alkyl, $C_{19}$-alkyl, or $C_{20}$-alkyl.

A specific value for $R^2$ is phenyl that is optionally substituted with one or more groups independently selected from the group consisting of $(C_1\text{-}C_6)$alkyl, $(C_3\text{-}C_6)$cycloalkyl, and phenyl.

A specific value for $R^2$ is $(C_3\text{-}C_{20})$cycloalkyl that is optionally substituted with one or more groups independently selected from the group consisting of $(C_1\text{-}C_6)$alkyl, $(C_3\text{-}C_6)$cycloalkyl, and phenyl.

A specific value for $R^2$ is $(C_3\text{-}C_{15})$cycloalkyl.
A specific value for $R^2$ is $(C_3\text{-}C_{10})$cycloalkyl.
A specific value for $R^2$ is $(C_3\text{-}C_6)$cycloalkyl.
A specific value for $R^2$ is $(C_6\text{-}C_{10})$cycloalkyl.

A specific value for $R^1$ and $R^2$ taken together with the atoms to which they are attached is a 5-15 membered heterocyclic ring that is optionally substituted with one or more groups independently selected from the group consisting of $(C_1\text{-}C_6)$alkyl, $(C_3\text{-}C_6)$cycloalkyl, and phenyl, wherein any phenyl of $R^1$ and $R^2$ is optionally substituted with one or more groups independently selected from the group consisting of $(C_1\text{-}C_6)$alkyl, $(C_3\text{-}C_6)$cycloalkyl, and phenyl.

A specific value for $R^1$ and $R^2$ taken together with the atoms to which they are attached is a 5-10 membered heterocyclic ring that is optionally substituted with one or more groups independently selected from the group consisting of $(C_1\text{-}C_6)$alkyl, $(C_3\text{-}C_6)$cycloalkyl, and phenyl, wherein any phenyl of $R^1$ and $R^2$ is optionally substituted with one or more groups independently selected from the group consisting of $(C_1\text{-}C_6)$alkyl, $(C_3\text{-}C_6)$cycloalkyl, and phenyl.

A specific value for $R^1$ and $R^2$ taken together with the atoms to which they are attached is a 5-8 membered heterocyclic ring that is optionally substituted with one or more groups independently selected from the group consisting of $(C_1\text{-}C_6)$alkyl, $(C_3\text{-}C_6)$cycloalkyl, and phenyl, wherein any phenyl of $R^1$ and $R^2$ is optionally substituted with one or more groups independently selected from the group consisting of $(C_1\text{-}C_6)$alkyl, $(C_3\text{-}C_6)$cycloalkyl, and phenyl.

A specific value for $R^1$ and $R^2$ taken together with the atoms to which they are attached is a 5-15 membered heterocyclic ring that is optionally substituted with one or more groups independently selected from the group consisting of $(C_1\text{-}C_6)$alkyl.

A specific value for $R^1$ and $R^2$ taken together with the atoms to which they are attached is a 5-10 membered heterocyclic ring that is optionally substituted with one or more groups independently selected from the group consisting of $(C_1\text{-}C_6)$alkyl.

A specific value for $R^1$ and $R^2$ taken together with the atoms to which they are attached is a 5-8 membered heterocyclic ring that is optionally substituted with one or more groups independently selected from the group consisting of $(C_1\text{-}C_6)$alkyl.

A specific value for $R^1$ is: methyl, ethyl, propyl, isopropyl, butyl, iso-butyl, sec-butyl, pentyl, iso-pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, phenyl, 4-ethylphenyl,

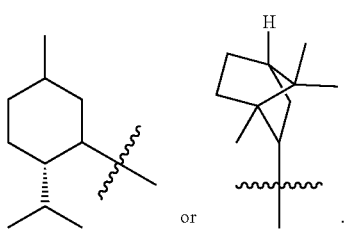 [SMILES: *C1CC(C)CC[C@H]1C(C)C ; *C1CC2CCC1(C)C2(C)C]

or

A specific value for R² is: methyl, ethyl, propyl, isopropyl, butyl, iso-butyl, sec-butyl, pentyl, iso-pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, phenyl, 4-ethylphenyl,

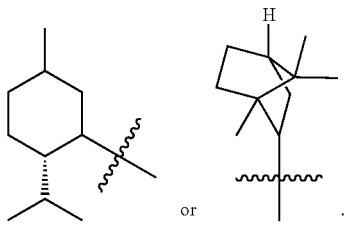 [SMILES: *C1CC(C)CC[C@H]1C(C)C ; *C1CC2CCC1(C)C2(C)C]

or

A specific compound is selected from the group consisting of:

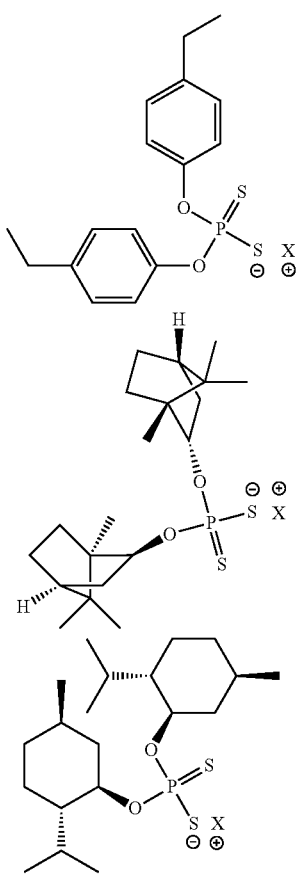

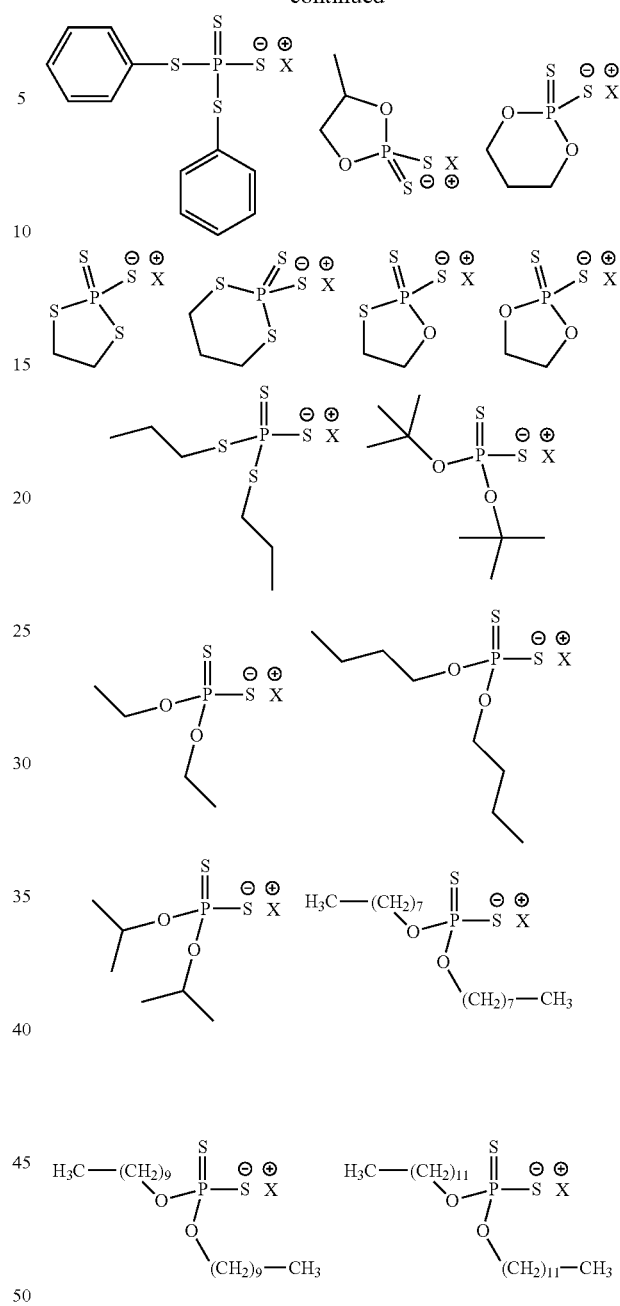

A specific compound is selected from the group consisting of:

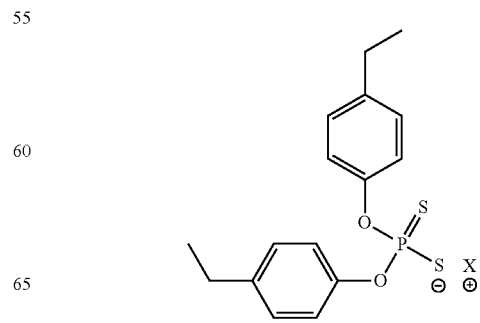

-continued
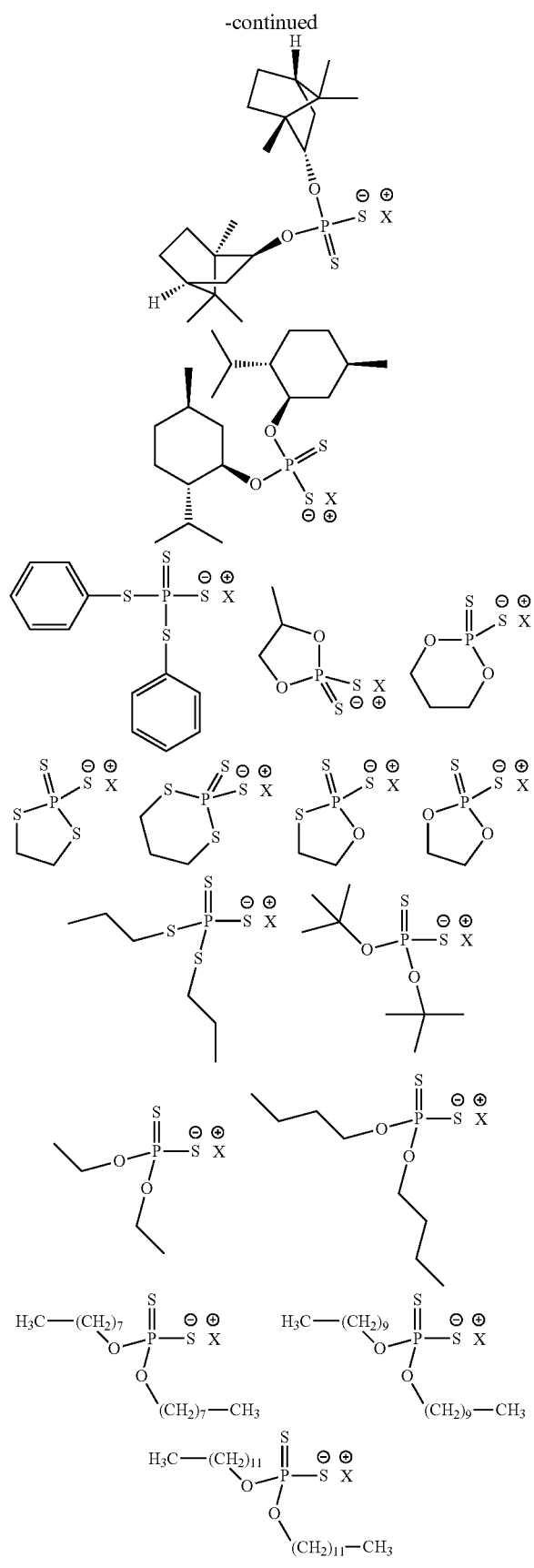
wherein X⁺ is a suitable cation.
A specific compound is selected from the group consisting of:
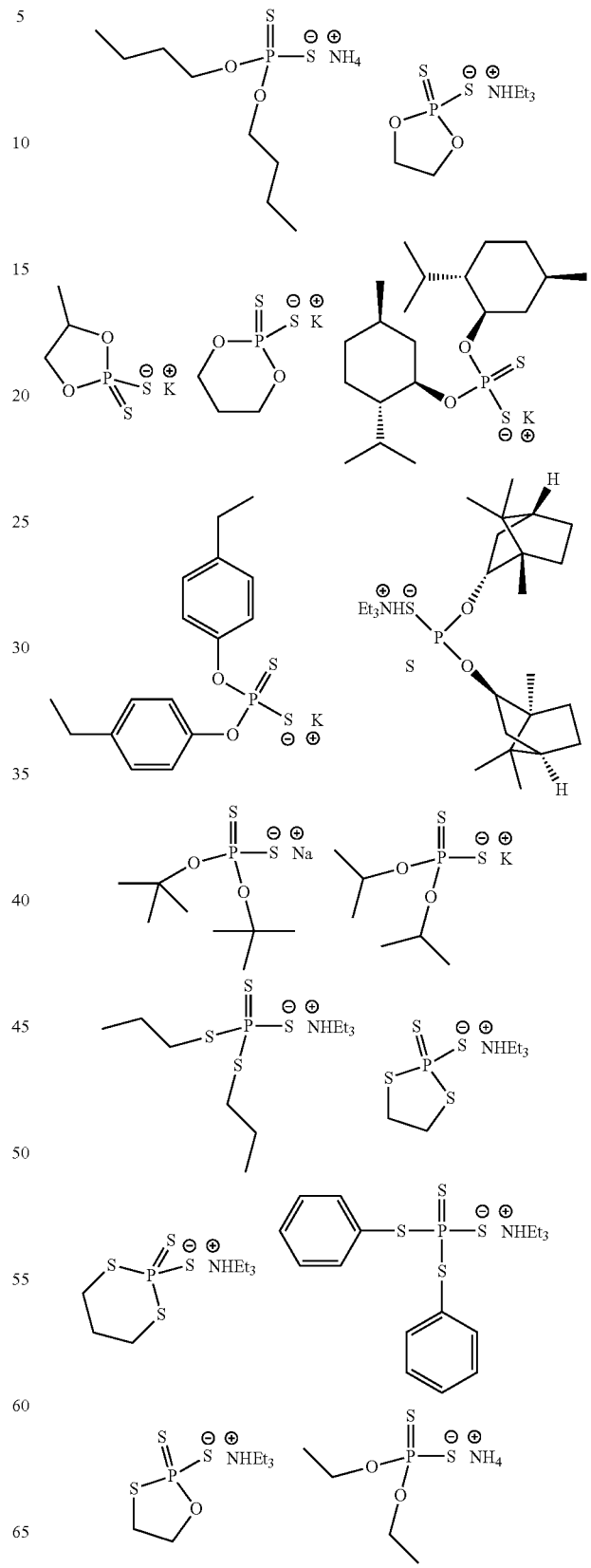

-continued

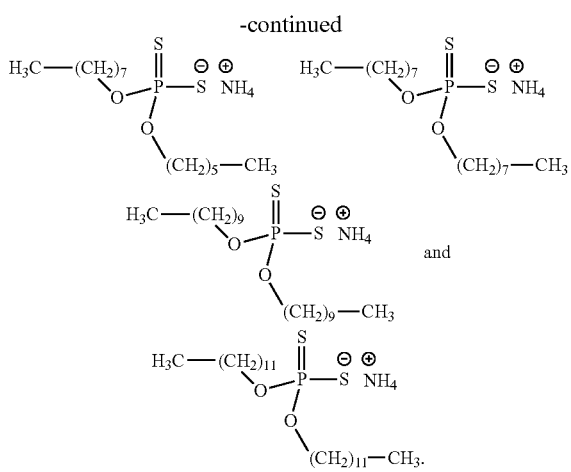

A specific value for X⁺ is a monovalent cation.

A specific value for X⁺ is a metal cation.

A specific value for X⁺ is an ammonium cation (e.g. $R_4N^+$, wherein each R is independently selected from ($C_1$-$C_6$)alkyl)

A specific value for X⁺ is potassium, sodium, or triethyl ammonium.

Processes for preparing compounds of formula I are provided as further embodiments of the invention and are illustrated by the following procedures in which the meanings of the generic radicals are as given above unless otherwise qualified.

The invention will now be illustrated by the following non-limiting Examples.

EXAMPLES

Example 1

Synthesis of Dibutyldithiophosphate Ammonium Salt

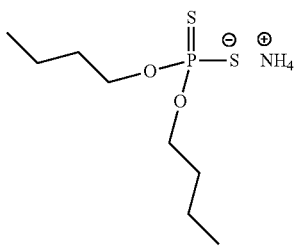

n-Butanol (30.9 mL, 338 mmol) was added slowly over 2 minutes to a mixture of $P_4S_{10}$ (18.66 g, 42.0 mmol) and toluene (75 mL). The contents were stirred at 85° C. for 16 hours. Toluene was removed under reduced pressure and the crude dibutyldithiophosphate was cooled in an ice bath and a 28% ammonium hydroxide solution in water (23.0 mL, 161.7 mmol) was added slowly over 2 minutes. Water was removed under reduced pressure yielding the dibutyldithiophosphate ammonium salt which was recrystallized twice from hot toluene to give a white solid (79% yield). ¹H NMR (300 MHz, CDCl₃) δ 6.97 (b, 4H), 4.00 (q, 4H), 1.67 (p, 4H), 1.38 (m, 4H), 0.94 (t, 6H); ¹³C NMR (75 MHz, CDCl₃) δ 66.92, 32.60, 19.23, 13.97; ³¹P NMR (300 MHz, CDCl₃) δ 109.89.

Example 2

Synthesis of

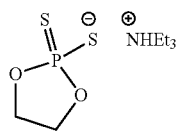

A mixture of 1,2-ethanediol (0.34 g, 5.36 mmol) and triethyl amine (0.58 g, 5.73 mmol) was added slowly over 2 minutes to a mixture of $P_2S_5$ (0.67 g, 2.98 mmol) and toluene (15 mL). The contents were stirred at 45° C. for 4 h. The pure chemical was obtained when the solution dried under reduced pressure and further purified by washing with DCM followed by hexane to give a white solid (77% yield). ¹H NMR (300 MHz, D2O) δ 4.31 (d, 4H), 3.13-3.21 (q, 6H), 1.24 (t, 9H). ¹³C NMR (300 MHz, CDCl₃) δ 68.14, 48.99, 11.36. ³¹P NMR (300 MHz, D2O) δ 129.86.

Example 3

Synthesis of

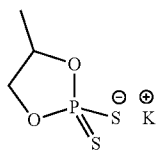

1,2-Propanediol (0.45 g, 6 mmol was added slowly over 2 minutes to a mixture of $P_2S_5$ (0.65 g, 3 mmol) and toluene (20 mL). The contents were stirred at 90° C. for 12 hours. To obtain crude compound, the contents were cooled in an ice bath, and 8 mL of a 0.75 M potassium hydroxide was added slowly over 2 min. The crude product was dried under reduced pressure and purified by flash chromatography using solvent system of 20% methanol in ethyl acetate as an eluent to yield a white solid (65% yield). ¹H NMR (300 MHz, CD₃OD) δ=4.80-4.85 (m, 1H), 4.54-4.59 (m, 1H), 3.75-3.82 (q, 1H), 1.35-1.37 (d, 3H), ³¹P NMR (300 MHz, CD₃OD) δ=129.33. ESI-MS m/z [M+] calculated: 168.9552, found: 168.9541.

Example 4

Synthesis of

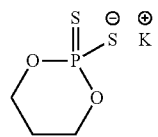

1,3-Propanediol (0.45 g, 4.15 mmol) was added slowly over 2 minutes to a mixture of $P_2S_5$ (0.56 g, 2.47 mmol) and toluene (15 mL). The contents were stirred at 90° C. for 16 h. Toluene was removed under reduced pressure, crude compound was cooled in an ice bath, and 8 mL of a 2 M potassium hydroxide was added slowly over 2 minutes. The pure compound was obtained when the solution dried under reduced pressure and further purified by flash chromatography using a 10% MeOH in DCM solvent system to give a white solid (75% yield). $^1$H NMR (300 MHz, $CD_3OD$) δ 4.28-4.37 (dt, 4H), 1.82-1.88 (m, 2H). $^{13}$C NMR (300 MHz, $CDCl_3$) δ 62.28, 34.17. $^{31}$P NMR (300 MHz, $CD_3OD$) δ 111.60.

Example 5

Synthesis of

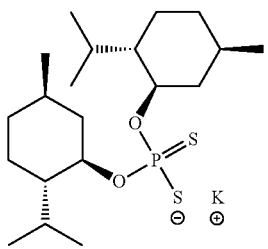 [SMILES: CC(C)[C@@H]1CC[C@@H](C)C[C@H]1OP(=S)([S-])O[C@@H]1C[C@H](C)CC[C@H]1C(C)C ; [K+]]

(+)-Menthol (1.25 g, 8 mmol) was added slowly over 2 minutes to a mixture of $P_2S_5$ (0.45 g, 2 mmol) and toluene (20 mL). The contents were stirred at 85° C. for 12 h. Toluene was removed under reduced pressure, crude compound was cooled in an ice bath, and 8 mL of a 0.78 M potassium hydroxide was added slowly over 2 minutes. The pure compound was obtained when the solution dried under reduced pressure and further purified by recrystallization from acetone to give a white solid (67% yield). $^1$H NMR (300 MHz, $CD_3OD$,) δ=4.23-4.46 (m, 2H), 2.54-2.61(m, 2H), 2.31-2.41(m, 2H), 1.62-1.66 (m, 4H), 1.33-1.45 (m, 2), 1.21-1.29 (m, 2H), 0.95-1.12 (m, 4H), 0.83-0.91 (m, 22H). $^{13}$C NMR (300 MHz, $CD_3OD$) δ 78.61, 50.45, 44.44, 35.72, 32.87, 26.07, 24.15, 22.69, 21.85, 17.11. $^{31}$P NMR (300 MHz, $CD_3OD$) δ=112.04.

Example 6

Synthesis of

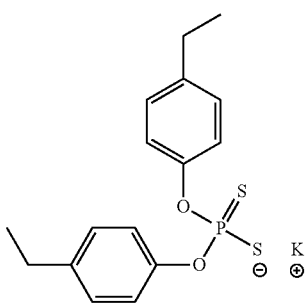 [SMILES: CCc1ccc(OP(=S)([S-])Oc2ccc(CC)cc2)cc1 ; [K+]]

4-Ethylphenol (0.98 g, 8 mmol) was added slowly over 2 minutes to a mixture of $P_2S_5$ (0.45 g, 2 mmol) and toluene (20 mL). The contents were stirred at 90° C. for 24 hours. Toluene was removed under reduced pressure, crude compound was cooled in an ice bath, and 8 mL of a 0.78 M potassium hydroxide was added slowly over 2 minutes. The pure compound was obtained when the solution dried under reduced pressure and further purified by flash chromatography with ethyl acetate as an eluent to give a white solid (82% yield). $^1$H NMR (300 MHz, DMSO-$d_6$) δ=7.08-7.12 (m, 4H), 2.46-2.54 (q, 2H), 1.14-1.18 (t, 3H). $^{13}$C NMR (300 MHz, $CDCl_3$) δ 140.85, 128.90, 122.00, 115.29, 28.25, 15.72. $^{31}$P NMR (DMSO-$d_6$) δ=108.28. ESI-MS m/z [M+] calculated: 337.0491, found: 337.0494.

Example 7

Synthesis of

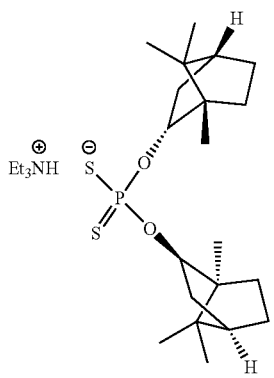 [SMILES: "Et3NH" ; CC1(C)[C@@H]2CC[C@]1(C)[C@H](OP(=S)([S-])O[C@@H]1C[C@H]3CC[C@@]1(C)C3(C)C)C2]

(−) Borneol (3.08 g, 20 mmol) was added slowly over 2 minutes to a mixture of $P_2S_5$ (1.10 g, 4.94 mmol) and toluene (20 mL). The contents were stirred at reflux for 2h. The solution was cooled in an ice bath, and triethylamine (1.01 g, 20 mmol) was added slowly over 2 minutes. The pure compound was obtained when the solution dried under reduced pressure and further purified by recrystallization from acetone to give a white solid (58% yield). $^1$H NMR (300 MHz, $CDCl_3$) δ=4.70-4.71 (t, 2H), 3.26-3.33(q, 6H), 2.20-2.24 (m, 2H), 2.09-2.17(m, 2H), 1.59-1.61 (m, 5H), 1.36-1.40 (t, 11H), 1.27-1.35 (m, 4 H), 0.85-0.96(t, 18H). $^{13}$C NMR (300 MHz, $CDCl_3$) δ 81.63, 49.53, 47.32, 45.92, 45.20, 37.47, 28.19, 27.23, 20.12, 19.13, 13.72, 8.68. $^{31}$P NMR (300 MHz, $CDCl_3$) δ=112.31(t).

Example 8

Synthesis of Di(Tert-Butanol)Dithiophosphate Sodium Salt

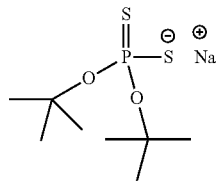

Tert-butanol (0.71 g, 9.54 mmol) was added slowly over 2 minutes to a mixture of $P_2S_5$ (0.52 g, 2.34 mmol) and THF (15 mL) under nitrogen. The contents were stirred at 45° C. for 5 hours. THF was removed under reduced pressure, crude compound was cooled in an ice bath, and 10 mL of a saturated NaHCO₃ was added slowly over 2 minutes. The crude product was dried under reduced pressure to give a white solid (74% yield). ¹H NMR (300 MHz, D₂O) δ 1.56 (b). ³¹P NMR (300 MHz, D₂O) δ 91.36.

Example 9

Synthesis of

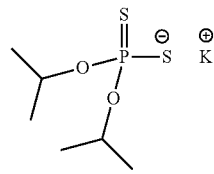

Iso-propanol (1.5 mL, 20 mmol) was added slowly over 2 minutes to a mixture of P₂S₅ (0.56 g, 2.5 mmol) and toluene (12 mL). The contents were stirred at 85° C. for 16 h. Toluene was removed under reduced pressure, crude compound was cooled in an ice bath, and 1.2 mL of a 5 M potassium hydroxide was added slowly over 2 minutes. The pure compound was obtained when the solution dried under reduced pressure and further purified by washing with hot toluene to give a white solid (81% yield). ¹H NMR (300 MHz, D₂O) δ=4.69-4.77 (m, 1H), 1.30-1.31 (d, 6H). ¹³C NMR (300 MHz, D₂O) δ 72.19, 23.09. ³¹P NMR (300 MHz, D₂O) δ=107.49.

Example 10

Synthesis of

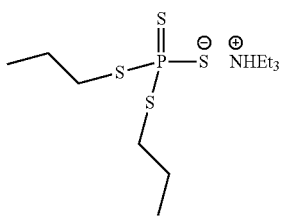

1-Propanethiol (0.59 g. 7.73 mmol) was added slowly over 2 minutes to a mixture of P₂S₅ (0.51 g, 2.24 mmol) and DCM (20 mL). The contents were stirred at reflux for 4 h. DCM was removed under reduced pressure, crude compound was cooled in an ice bath, and triethylamine (0.59 g, 5.73 mmol) was added slowly over 2 minutes The pure compound was obtained when the solution dried under reduced pressure and further purified by flash chromatography using a 10% MeOH in DCM solvent system to give a colorless oily liquid (66% yield). ¹H NMR (300 MHz, CD₃OD) δ 3.18-3.25 (q, 6H), 2.79-2.88 (dt, 4H), 1.65-1.78 (m, 4H), 1.31 (t, 9H), 0.99 (t, 6H). ¹³C NMR (300 MHz, CDCl₃) δ 48.96, 37.11, 29.37, 11.44. ³¹P NMR (300 MHz, CD₃OD) δ 99.87.

Example 11

Synthesis of

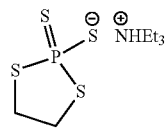

1,2-Ethanedithiol (0.45 g, 4.79 mmol) was added slowly over 2 minutes to a mixture of P₂S₅ (0.51 g, 2.25 mmol) and DCM (15 mL). The contents were stirred at reflux for 3 h. DCM was removed under reduced pressure, crude compound was cooled in an ice bath, and triethylamine (0.59 g, 5.74 mmol) was added slowly over 2 minutes. The pure compound was obtained when the solution dried under reduced pressure and further purified by flash chromatography using a 20% MeOH in DCM solvent system to give a white solid (92% yield). ¹H NMR (300 MHz, DMSO-d₆) δ 3.54 (d, 4H), 3.01-3.13 (q, 6H), 1.17 (t, 9H). ¹³C NMR (300 MHz, CDCl₃) δ 48.94, 31.39, 14.31. ³¹P NMR (300 MHz, DMSO-d₆) δ 111.73. ESI-MS m/z [M+] calculated: 186.8938, found: 186.8936.

Example 12

Synthesis of

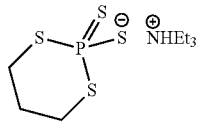

1,3-Propanedithiol (0.43 g, 4.52 mmol) was added slowly over 2 minutes to a mixture of P₂S₅ (0.51 g, 2.25 mmol) and DCM (15 mL). The contents were stirred at reflux for 3 h. DCM was removed under reduced pressure, crude compound was cooled in an ice bath, and triethylamine (0.59 g, 5.74 mmol) was added slowly over 2 minutes. The pure compound was obtained when the solution dried under reduced pressure and further purified by flash chromatography using a 30% MeOH in DCM solvent system to give a white solid (93% yield). ¹H NMR (400 MHz, DMSO-d₆) δ 3.07-3.15 (m, 10H), 1.83-1.91 (p, 2H), 1.17 (t, 9H). ¹³C NMR (300 MHz, CDCl₃) δ 48.96, 37.06, 29.37, 11.44. ³¹P NMR (300 MHz, DMSO-d₆) δ 78.62. ESI-MS m/z [M+] calculated: 200.9095, found: 200.9090.

Example 13

Synthesis of

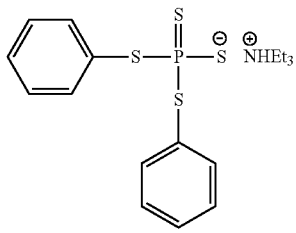 [SMILES: S=P([S-])(Sc1ccccc1)Sc1ccccc1 ; "NHEt3"]

Thiophenol (1.08 g, 9.98 mmol) was added slowly over 2 minutes to a mixture of $P_2S_5$ (0.51 g, 2.26 mmol) and DCM (10 mL). The contents were stirred at reflux for 5 h. DCM was removed under reduced pressure, crude compound was cooled in an ice bath, and triethylamine (0.58 g, 5.73 mmol) was added slowly over 2 minutes. The pure compound was obtained when the solution dried under reduced pressure and further purified by flash chromatography using a 20% MeOH in DCM solvent system to give a white solid (82% yield). $^1$H NMR (300 MHz, $CD_3OD$) δ 7.63-7.67 (m, 4H), 7.29-7.34 (m, 6H), 3.16-3.23 (q, 6H), 1.29 (t, 9H), $^{13}$C NMR (300 MHz, $CD_3OD$) δ 131.81, 129.28, 124.14, 47.60, 9.41. $^{31}$P NMR (300 MHz, $CD_3OD$) δ 100.70. ESI-MS m/z [M+] calculated: 312.9408, found: 312.9412.

Example 14

Synthesis of

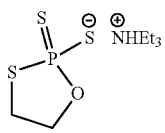

2-Mercaptoethanol (0.45 g, 5.83 mmol) was added slowly over 2 minutes to a mixture of $P_2S_5$ (0.54 g, 2.47 mmol) and DCM (15 mL). The contents were stirred at reflux for 3 h. DCM was removed under reduced pressure, crude compound was cooled in an ice bath, and triethylamine (0.28 g, 2.86 mmol) was added slowly over 2 minutes. The pure compound was obtained when the solution dried under reduced pressure to give a colorless oily liquid (86% yield). $^1$H NMR (300 MHz, $CD_3OD$) δ 4.01-4.09 (dt, 2H), 3.21-3.28 (q, 6H), 2.74 (t, 2H), 1.33 (t, 9H). $^{13}$C NMR (300 MHz, $CDCl_3$) δ 70.18, 48.88, 27.70, 11.46. $^{31}$P NMR (300 MHz, CD30D) δ 112.39.

Example 15

Synthesis of

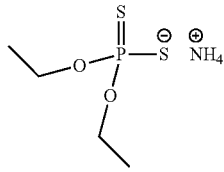

The title compound was prepared using procedures similar to those described in Examples 1 and 2 and using the following reagents: ethanol (4.7 mL, 81.0 mmol), $P_4S_{10}$ (4.38 g, 9.85 mmol), toluene (40 mL), 28% ammonium hydroxide in water (4.4 mL, 30.1 mmol). The product was recrystallized twice from hot ethanol to give a pink solid (31% yield). $^1$H NMR (300 MHz, $D_2O$) δ 4.06 (q, 4H), 1.30 (t, 6H); $^{13}$C NMR (75 MHz, $D_2O$) δ 65.58, 18.07; $^{31}$P NMR (300 MHz, $D_2O$) δ 111.60.

Example 16

Synthesis of Dihexyldithiophosphate Ammonium Salt

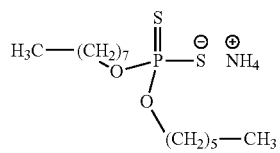

The title compound was prepared using procedures similar to those described in Examples 1 and 2 and using the following reagents: n-hexanol (2.5 mL, 19.5 mmol), $P_4S_{10}$ (1.08 g, 2.43 mmol), toluene (20 mL), 28% ammonium hydroxide in water (0.7 mL, 5.2 mmol). The product was isolated as a white solid (75% yield). $^1$H NMR (300 MHz, $CDCl_3$) δ 7.09 (b, 4H), 3.96 (q, 4H), 1.69 (p, 4H), 1.32 (m, 12H), 0.89 (t, 6H); $^{13}$C NMR (75 MHz, $CDCl_3$) δ 67.34, 31.70, 30.49, 25.69, 22.78, 14.19; $^{31}$P NMR (300 MHz, $CDCl_3$) δ 109.69.

Example 17

Synthesis of Dioctyldithiophosphate Ammonium Salt

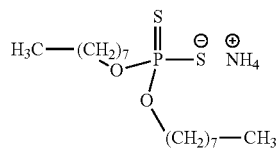

The title compound was prepared using procedures similar to those described in Examples 1 and 2 and using the following reagents: n-octanol (15.0 mL 94.4 mmol), $P_4S_{10}$ (5.07 g, 11.4 mmol), toluene (60 mL), 28% ammonium hydroxide in water (5.9 mL, 40.1 mmol). The product was isolated as a white solid (73% yield). $^1$H NMR (300 MHz, CDCl$_3$) δ 6.96 (b, 4H), 3.95 (q, 4H), 1.68 (p, 4H), 1.27 (m, 20H), 0.88 (t, 6H); $^{13}$C NMR (75 MHz, CDCl$_3$) δ 67.24, 32.03, 30.57, 29.50, 29.36, 26.07, 22.83, 14.25; $^{31}$P NMR (300 MHz, CDCl$_3$) δ 109.67.

Example 18

Synthesis of Didecyldithiophosphate Ammonium Salt

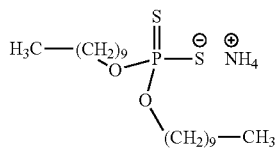

The title compound was prepared using procedures similar to those described in Examples 1 and 2 and using the following reagents: n-decanol (5.80 mL, 30.4 mmol), P$_4$S$_{10}$ (1.69 g, 3.80 mmol), toluene (25 mL), 28% ammonium hydroxide in water. The product was isolated as a white solid (74% yield). $^1$H NMR (300 MHz, CDCl$_3$) δ 6.65 (b, 4H), 3.97 (q, 4H), 1.68 (p, 4H), 1.26 (m, 28H), 0.88 (t, 6H); $^{13}$C NMR (75 MHz, CDCl$_3$) δ 67.34, 32.10, 30.59, 29.89, 29.83, 29.64, 29.55, 26.09, 22.85, 14.26; $^{31}$P NMR (300 MHz, CDCl$_3$) δ 109.57.

Example 19

Synthesis of Didodecyldithiophosphate Ammonium Salt

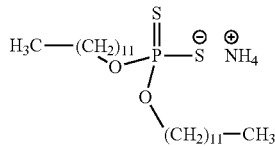

The title compound was prepared using procedures similar to those described in Examples 1 and 2 and using the following reagents: n-dodecanol (16.7 mL, 73.5 mmol), P$_4$S$_{10}$ (4.10 g, 9.22 mmol), toluene (30 mL), 28% ammonium hydroxide in water (4.20 mL, 29.5 mmol). The product was isolated as a white solid (82% yield). $^1$H NMR (300 MHz, CDCl$_3$) δ 7.13 (b, 4H), 3.95 (q, 4H), 1.68 (p, 4H), 1.26 (m, 28H), 0.88 (t, 6H); $^{13}$C NMR (75 MHz, CDCl$_3$) δ 67.24, 32.10, 30.59, 29.92, 29.67, 29.56, 29.64, 26.10, 22.85, 14.25; $^{31}$P NMR (300 MHz, CDCl$_3$) δ 109.58.

Example 20

Growth of Corn Exposed to Dibutyldithiophosphate

Corn was planted in 6" TEKU pots. The pots were packed finger tight with potting mix #4 from Beautiful Land Products. The corn seeds were planted approximately 1.5 inches deep. Fifty seeds of corn were planted for every loading of dibutyldithiophosphate ammonium salt. After the seeds were added to the soil the dibutyldithiophosphate ammonium salt was added as a fully dissolved aqueous solution. Tap water (500 mL) was added to a measured amount of the salt to yield desired amount in 10 mL. After mixing well for 10 minutes, the aqueous solution was added to each plant via syringe (10 mL) immediately around and on the seed. After adding the salt, the plants were moved outside in full sunlight until harvest. The corn plants were watered daily.

The corn was harvested after 4 weeks. Plant height was taken by straightening the corn plant out by the leaves and measuring from the base of the shoot to the longest point on the leaf. After removing the roots, the weight of the shoot and leaves was measured using a balance.

Statistical analysis was performed using IBM SPSS Statistics 25. Non-parametric Kruskal-Wallis test was performed to determine significance. Data represented are mean±standard error with ** indicating α<0.05 and * indicating α<0.1. Results for plant height are shown in FIG. 1a. Results for plant mass are shown in FIG. 1b.

The results in FIG. 1 show that dibutyldithiophosphate has a strong effect on the growth of corn plants. The weight of the plants showed statistically significant improvements at 1, 10, 50, and 75 mg loadings of dibutyldithiophosphate and improvements in weights for all loadings except 100 and 200 mg. The weight of the corn plants increased by 39% when only 1 mg of the dibutyldithiophosphate salt was added to the soil adjacent to the seed compared to plants grown in the absence of the dibutyldithiophosphate salt. Importantly, one milligram of this salt will release only 0.28 mg of H$_2$S. These results demonstrated that milligram amounts of H$_2$S delivered over 4 weeks could have a strongly positive effect on the weight of corn plants. Little statistically significant difference was seen for the heights of the plants. The heights of the plants report one dimension of the overall size of plants, but small differences in heights can lead to larger differences in weight.

Example 21

Growth of Peas Exposed to Dibutyldithiophosphate

Peas were planted and grown in 8.25 inch TEKU pots. The pots were packed finger tight with potting mix #4 from Beautiful Land Products. The pea seeds were planted approximately 1.5 inches deep. 25 seeds were planted per dosing of dibutyldithiophosphate potassium salt. After the seeds were planted into the soil the desired amount of dibutyldithiophosphate for 32 doses was added to 160 mL of tap water. After mixing well for 10 minutes, 5 mL of the dibutyldithiophosphate solution was then added to the top of each seed after it was planted in the soil. Soil was then used to cover the seed. After adding the salt, the plants were moved outside in full sunlight until harvest. The pea plants were watered daily. Peter's Professional B 20-20-20 water soluble fertilizer was used at 1 tablespoon per 3 gallons of tap water and 350 mL of this solution was added to each plant. Plants were fertilized on day 44, 51, 66, 73, and 81.

Figure 2A:
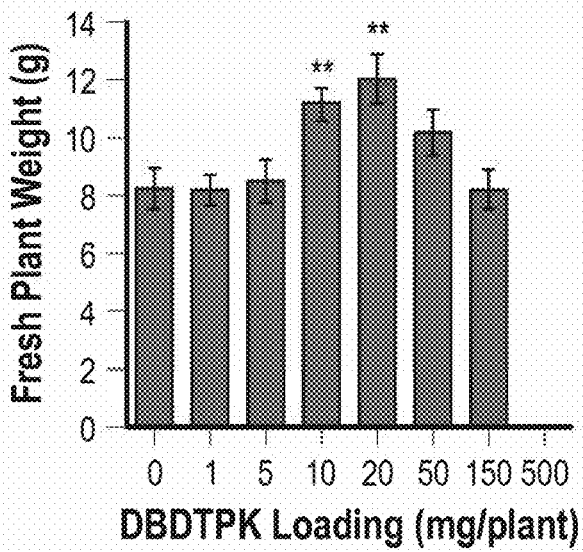
FIGS. 2A-2C show pea harvest measuring A) fresh weight of plant without roots, B) the number of pods, and C) the total fresh weight of pods (see Example 21).
Figure 2B:
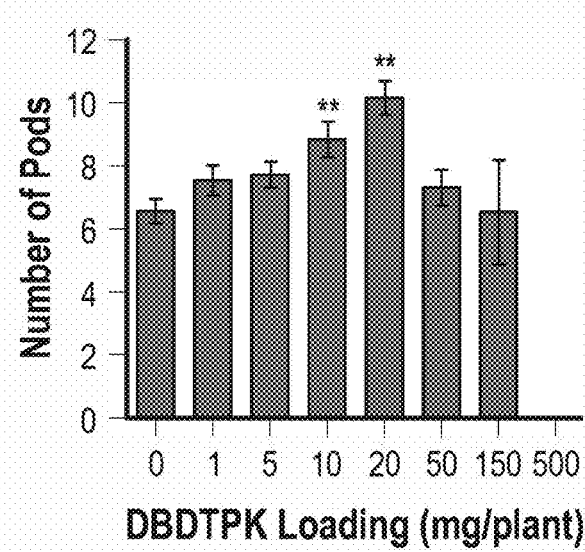
Figure 2C:
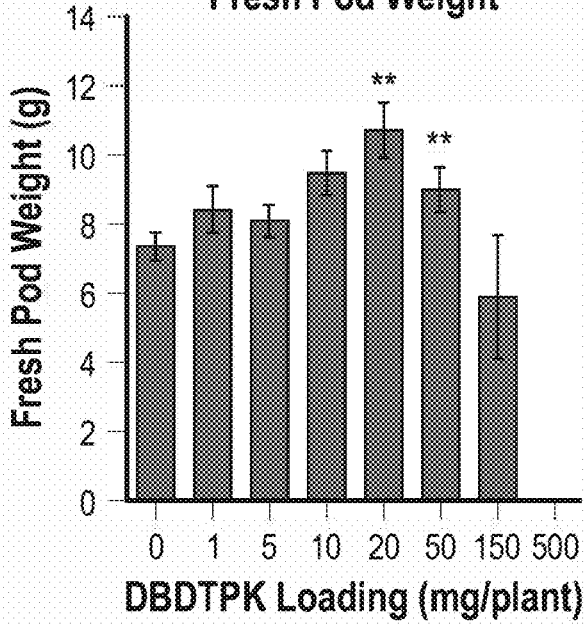

The pea plants were harvested after 88 days. The plant was harvested by cutting the above soil portion of the plant at the root-stem boundary. The above ground portion of the plant was weighed in its entirety. Next the pods were removed, counted and weighed separately from the rest of the plant. Statistical analysis was performed using IBM SPSS Statistics 25. Dunnett's 2-sided t-test was performed to determine significance. Data represented are mean±standard error with ** indicating α<0.05 and * indicating α<0.1. Results for plant hight are shown in FIG. 2a. Results for plant mass are shown in FIG. 2b.

There is a strong effect between adding the dibutyldithiophosphate potassium salt and an increase in plant weight, number of pea pods and pod weight. 20 mg of dibutyldithiophosphate per plant lead to 55% increase in number of pods, a 46% increase in plant weight and a increase 45% in total pod weight. 10 mg per plant also saw statistically significant increase in all of the same metrics. 150 mg and 500 mg saw reduction in germination compared to the control plants with 6 plants dosed with 150 mg of dibutyldithiophosphate germinating. None of the seeds dosed with 500 mg dibutyldithiophosphate germinated. For 20 mg of dibutyldithiophosphate potassium salt, only 2.28 mg of $H_2S$ is being released. This demonstrates the large effect that $H_2S$ can have over 88 days for the harvest of pea plants.

Example 22

Hydrolysis of Dithiophosphates in $D_2O/H_2O$

The hydrolysis of dithiophosphates was tracked by $^{31}P$ NMR spectroscopy to investigate stabilities at room temperature when dissolved in 90% $H_2O/D_2O$ for 30 days (Table 1). The chemicals were added to NMR tubes, dissolved in 90% $H_2O/D_2O$, and the $^{31}P$ NMR spectra were measured on days 0 and 30. In prior work, less than 3% of dithiophosphates synthesized from fatty alcohols hydrolyzed after 35 days, and the results shown in Table 1 were consistent with that observation. Of the thirteen chemicals investigated, eight of the dithiophosphates showed less than 3% hydrolysis and three others were not soluble in water and not investigated. The potassium and triethylamine salts of 5, 7, and 13 were synthesized in attempts to improve solubility, but these salts were insoluble in water.

TABLE 1

The degradation of dithiophosphates were followed by $^{31}P$ NMR spectroscopy for 30 days at room temperature in 90% $H_2O/D_2O$.

| Example | Percent Degradation |
| --- | --- |
| 1 | <3 |
| 2 | <3 |
| 3 | <3 |
| 4 | <3 |
| 5 | IS[a] |
| 6 | <3 |
| 7 | IS |
| 8 | 100 |
| 9 | <3 |
| 10 | <3 |
| 11 | <3 |
| 12 | <3 |
| 13 | <3 |
| 14 | 100 |

[a]IS = insoluble.
[c]A 3:1 DMSO:water mixture was used due to the chemical being insoluble in water.

Surprisingly, the compounds of Examples 8 and 14 were completely hydrolyzed in 90% $H_2O/D_2O$ after 30 days. The compound of Example 14 was 60% hydrolyzed after 4 days and completely hydrolyzed on day 13. This result was in contrast to the compounds of Examples 2, 3, and 11 that also had five-membered rings with either oxygen or sulfur. The dithiophosphate of Example 8 hydrolyzed slower than the compound of Example 14, and at days 12 and 20 it was 62% and 88% degraded. The hydrolysis of the compound of Example 8 was much faster than the dithiophosphates synthesized from primary or secondary alcohols.

Example 23

Kinetics of Hydrolysis of Dithiophosphates

The hydrolysis of dithiophosphates were investigated in 90% $H_2O/D_2O$ at 85° C. by $^{31}P$ NMR spectroscopy. This temperature was chosen to accelerate the hydrolysis that was very slow at room temperature. The dithiophosphates were dissolved at known concentrations and the NMR tubes were placed in an oil bath at 85° C. The NMR tubes were periodically removed from the oil bath, the $^{31}P$ NMR spectra were collected, and the NMR tubes were placed back in the 85° C. oil bath.

Figure 3:
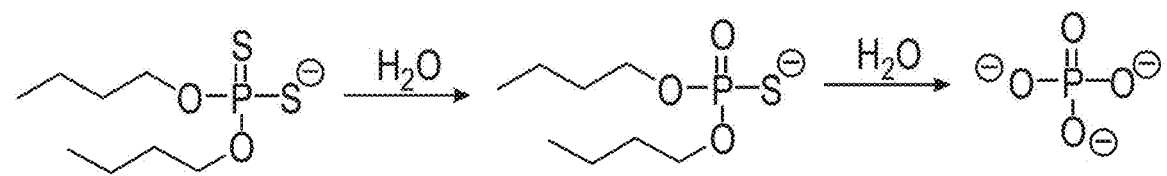
FIG. 3. illustrates the mechanism of hydrolysis of dibutyldithiophosphate.

The hydrolysis of dithiophosphates followed pseudo first-order reaction rates. In prior work the hydrolysis of dibutyldithiophosphate was found to follow the mechanism shown in FIG. 3. The first step of the hydrolysis was release of $H_2S$ and the oxo intermediate was observed in the $^{31}P$ NMR spectra. No other intermediates were observed during this reaction for dibutyldithiophosphate. In the hydrolysis at 85° C., low concentrations of multiple intermediates were only observed for the compounds of Examples 14 and 4. The remainder of the compounds displayed one or no intermediates. All of the compounds degraded to release phosphoric acid. The rate constant of the first step in the reaction, half lives ($t_{1/2}$) of the first step, and time for the dithiophosphates to completely hydrolyze to yield phosphoric acid are shown in Table 2.

TABLE 2

The rate constant and half-life for the first step in the hydrolysis are shown. In addition, the time to complete hydrolysis of the dithiophosphates to phosphoric acid are shown.

| Example | Rate of first-step of hydrolysis (85° C.) | $t_{1/2}$ (days) | Time to complete hydrolysis[a] |
| --- | --- | --- | --- |
| 1 | $9.6 * 10^{-4} h^{-1}$ | 30 | 180 days |
| 2 | $3.4 * 10^{-3} h^{-1}$ | 8.5 | 49 days |
| 3 | $7.1 * 10^{-3} h^{-1}$ | 4.1 | 23 days |
| 4 | $6.9 * 10^{-4} h^{-1}$ | 42 | 200 days |
| 6 | $7.4 * 10^{-3} h^{-1}$ | 3.9 | 10 days |
| 8 | $13.2 h^{-1}$ | 0.0021 | 71 minutes |
| 9 | $1.7 * 10^{-3} h^{-1}$ | 17 | 85 days |
| 10 | $2.2 * 10^{-1} h^{-1}$ | 0.13 | 0.65 days |
| 11 | $3.4 * 10^{-1} h^{-1}$ | 0.085 | 0.44 days |
| 12 | $1.9 * 10^{-2} h^{-1}$ | 1.5 | 9 days |
| 13[b] | $2.2 * 10^{-2} h^{-1}$ | 1.3 | 7 days |
| 14 | $14.1 h^{-1}$ | 0.0020 | 81 minutes |
| 8 (room temperature) | $5.1 * 10^{-3} h^{-1}$ | 5.7 | 30 days |
| 14 (room temperature) | $1.1 * 10^{-2} h^{-1}$ | 2.9 | 12 days |

[a]The hydrolysis was complete when the corresponding dithiophosphate was no longer observed and only phosphoric acid was observed by $^{31}P$ NMR spectroscopy.
[b]A 3:1 DMSO:water mixture was used.

The hydrolysis of the compounds of Examples 8 and 14 was rapid and completed within 90 minutes at 85° C., so their rates of hydrolysis were measured at room temperature and shown in Table 2. Their rates of hydrolysis were 2,600× for the compound of Example 8 and 1,300× for the compound of Example 14 slower at room temperature than at 85° C., but both chemicals were completely hydrolyzed within 30 days at room temperature.

The results in Table 2 show several important findings about how the structure of the dithiophosphates affects their rates of hydrolysis. Dialkoxydithiophosphates synthesized with primary, secondary, and tertiary alcohols have relative rates of 1.00: 1.78: 13,800. The large difference in rates of hydrolysis for dithiophosphates synthesized from tertiary to secondary and primary alcohols was unexpected.

Comparing the rates of hydrolysis of dialkoxydithiophosphates to disulfidedithiophosphates shows the disulfidedithiophosphates hydrolyze much faster. The dithiophosphate of Example 10, synthesized from a primary thiol, had a rate of hydrolysis 230× faster than the compound of Example 1 which was synthesized from a primary alcohol. The difference between the rates of hydrolysis were much smaller when the dithiophosphate synthesized using ethylphenol (the compound of Example 6) was compared to the dithiophosphate synthesized from thiophenol (the compound of Example 13). The hydrolysis of the compound of Example 13 was only 3.0× faster than the compound of Example 6. The hydrolysis of the compound of Example 6 was 8.0× faster than the hydrolysis of the compound of Example 1, but when the oxygen was replaced with sulfur the hydrolysis of the thiophenol dithiophosphate (the compound of Example 13) was 10× faster than the hydrolysis of the primary thiol dithiophosphate (the compound of Example 10).

Prior work showed that the hydrolysis of phosphates that possess oxygens rather than sulfurs and synthesized from diols such as ethylene glycol hydrolyze up to $10^5$ faster than similar phosphates synthesized from primary alcohols. Although the heterosubstituted five-membered ring in phosphate synthesized from ethylene glycol was strained, it was shown that the difference for rates of hydrolysis were related to differences in solvation. This trend was not observed with dithiophosphates synthesized from diols or disulfides. The dithiophosphate synthesized from n-butanol (the compound of Example 1) hydrolyzed only 3.5× slower than dithiophosphate the compound of Example 2 synthesized from ethylene glycol, 7.4× slower than the five membered ring dithiophosphate of Example 3, and 1.4× slower than the six membered ring dithiophosphate of Example 4. Interestingly, the rates of hydrolysis of similarly structured disulfidedithiophosphates with five (the compound of Example 1) and six (the compound of Example 12) membered rings containing sulfur atoms were within 2× of the rate of hydrolysis of the compound of Example 10.

Example 24

Free Energy Values of the Transition State of Select Dithiophosphates

To better understand why the rates of hydrolysis were rapid for the compounds of Examples 8 and 14 at room temperature and 85° C., the rate constants were measured for the compounds of Examples 8, 10, 11, and 14 at a variety of temperatures to extract the values for $\Delta H^\ddagger$ and $\Delta S^\ddagger$. The hydrolysis of phosphates has been well studied in the literature due to their importance in RNA, DNA, and more. Most mechanisms of hydrolysis proceed by a two-step $S_N2P$ mechanism with the incoming nucleophile attacking the phosphorous followed by an elimination step. Computational studies of the mechanism of hydrolysis mostly confirm a two-step mechanism, but in some studies only one transition state was observed when a sulfur replaced one of the oxygens in the chemical being investigated. Furthermore, some hydrolysis mechanisms follow a SNIP mechanism where the phosphate loses an alcohol before the nucleophile attacks the phosphorous.

The rate constants for the hydrolysis of the compounds of Examples 8, 10, 11, and 14 were measured at temperatures from 25 to 85° C. These Examples were selected based on their relatively rapid rates of hydrolysis that would allow these rates to be measured at a wide range of temperatures, and to provide structurally similar compounds to 8 and 14 to compare their rates of hydrolysis. The values for $\Delta H^\ddagger$ and $\Delta S^\ddagger$ were calculated and reported in Table 3.

Although the values for $\Delta H^\ddagger$ ranged from a low of 77.6 to a high of 137.1 kJ mol$^{-1}$, the most interesting values are those for $\Delta S^\ddagger$. The $\Delta S^\ddagger$ of the compound of Example 10 was strongly negative which is consistent with a $S_N2P$ mechanism and similar to numerous other values for $\Delta S^\ddagger$ found for the hydrolysis of dithiophosphates. In contrast, the values for $\Delta S^\ddagger$ were positive for the compounds of Examples 8, 11, and 14 although the value for the compound of Example 14 was close to zero. The interpretation for the positive values of $\Delta S^\ddagger$ was unclear due to the several mechanisms of hydrolysis of phosphates that have been reported. The positive $\Delta S^\ddagger$ values may be due to the hydrolysis following a $S_N1P$ mechanism, following a $S_N2P$ mechanism and possessing the elimination of a group from the phosphate as the rate determining step, or by following a mechanism other than either of these mechanisms.

The data in Table 3 allows the rate of hydrolysis of four dithiophosphates to be calculated at any reasonable temperature encountered in an agricultural setting. This result is important because it allows the release of $H_2S$ to be correlated to their effect on plants.

TABLE 3

Enthalpy, entropy, and free energy values of the transition state of examples 8, 10, 11, and 14.

| Example | $\Delta H^\ddagger$ (kJ/mol) | $\Delta S^\ddagger$ (J/mol · K) | -T$\Delta S^\ddagger$ (25° C.) (kJ/mol) | $\Delta G^\ddagger$ (25° C.) (kJ/mol) | $\Delta G^\ddagger$ (85° C.) (kJ/mol) | $\Delta \Delta G^\ddagger$ (kJ/mol) |
|---|---|---|---|---|---|---|
| 8 | 116.5 | 36.3 | −10.8 | 105.7 | 103.5 | 2.2 |
| 10 | 77.6 | −109.6 | 32.7 | 110.2 | 116.8 | −6.6 |
| 11 | 137.1 | 58.4 | −17.4 | 119.7 | 116.2 | 3.5 |
| 14 | 104.3 | 2.46 | −0.733 | 103.5 | 103.4 | 0.1 |

Example 25

Figures 4A, 4B:
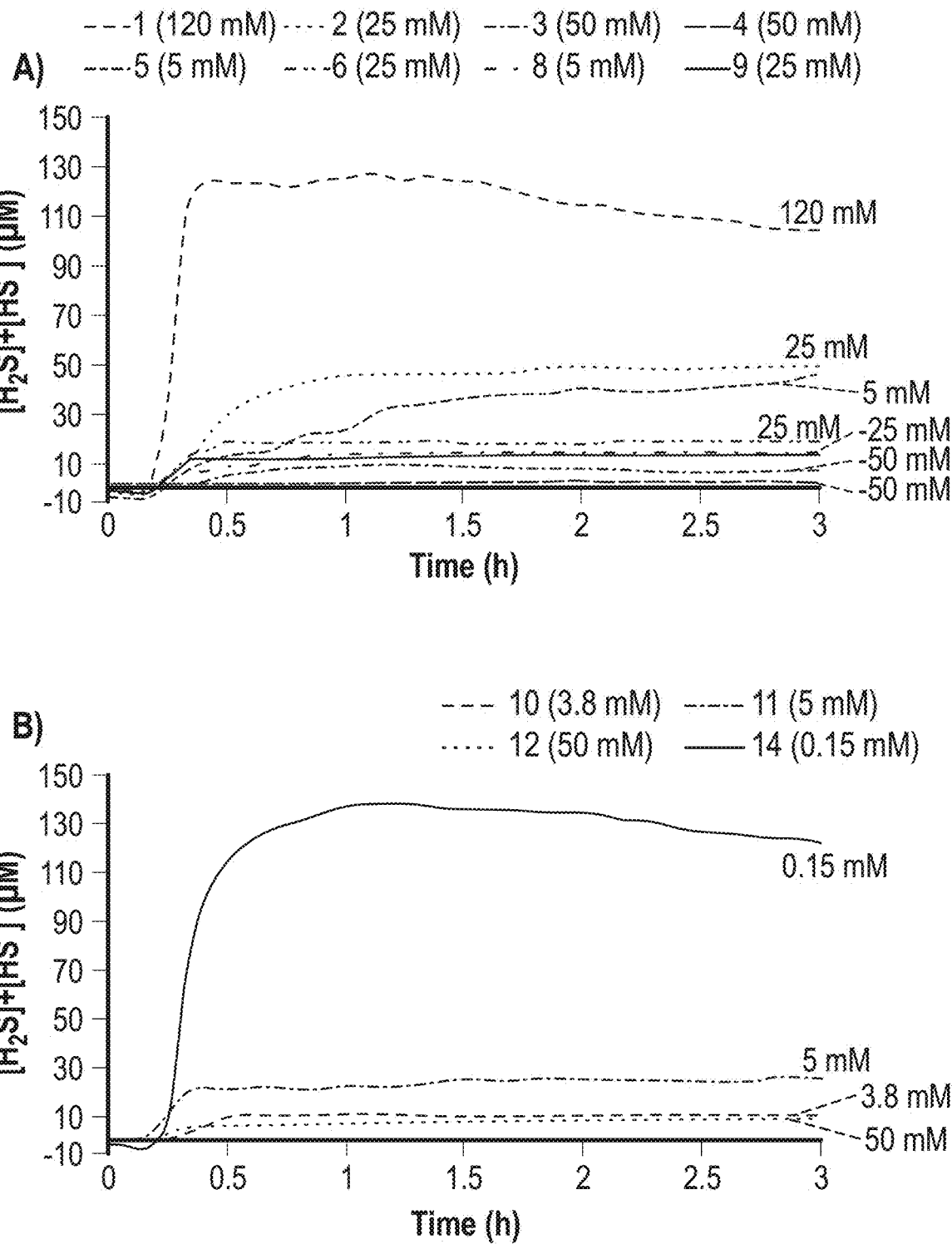
FIGS. 4A-4B show concentration of sulfide from A) dialkoxydithiophosphates and B) disulfidedithiophosphates. The concentrations of sulfide were found using $H_2S$ and pH electrodes (Example 25).

$H_2S$ Release from Dithiophosphates Measured using an $H_2S$ Electrode $H_2S$ release from the dithiophosphates were measured using $H_2S$ and pH electrodes (FIG. 4). An advantage of this method over the use of dyes or the methylene blue method is that it can be used to acquire data every few seconds for hours. The electrode measured the concentration of $H_2S$, but this can underestimate the release of $H_2S$ because it has a pKa of 7.0 so a fraction of the $H_2S$ will be in the form of $HS^-$. The fraction of $S^{2-}$ is negligible due to the high pKa of $HS^-$ which is reported to be in excess of 10. The simultaneous measurement of the concentration of $H_2S$ and the pH allows the total concentration of sulfide to be calculated. In each of these experiments the electrodes were immersed in water buffered at a pH of 6.7 to provide a baseline of no $H_2S$ release. Next, the dithiophosphates were dissolved in buffered water and added to the buffer with the electrodes. The system was sealed with a rubber stopper while the measurements were taken. $H_2S$ was detected shortly after the addition of each dithiophosphate and remained fairly constant throughout the measurements.

The data in FIG. 4 shows that the release of $H_2S$ from the dithiophosphates mostly followed the trend of the rate constants in Table 2. The highest release of $H_2S$ was from the compound of Example 8 and the compound of Example 14 that had the fastest rate constants, and the lowest release of $H_2S$ were from the compound of Example 1 and the compound of Example 4 that had the slow rate constants. Dithiophosphate (the compound of Example 5), although mostly insoluble in water at a concentration of 5 mM, released $H_2S$ at this concentration. Dithiophosphates (Examples 7 and 13) were also insoluble in water, and when solutions of these chemicals were made at 50 mM they did not show any release of $H_2S$ (FIG. S61-S62).

Example 26

Increased Harvest Yield of Corn using a Dithiophosphate

The effect of the slow release of $H_2S$ on the harvest yield of crops grown outside in fields for months has not been investigated. This represents a large challenge in this area since the amount of rain cannot be controlled, the chemicals that release $H_2S$ may diffuse away from the seeds, and the chemicals and $H_2S$ may interact in unknown ways with components of the soil. Despite these challenges, the use of dithiophosphates or other slow-releasing $H_2S$ chemicals represent a new method to potentially increase the harvest weight of crops. Field trials were completed to investigate how dibutyldithiophosphate affects the harvest yield of corn. In these trials dibutyldithiophosphate was added with nitrogen-phosphorous-potassium (NPK) starter fertilizer when the seeds were planted. A starter fertilizer of 2-40-28 was applied at a rate of 5 gallons per acre, and dibutyldithiophosphate was added to it to yield an application of 0, 0.5, 1.0, or 2.0 kg per acre of dibutyldithiophosphate. The starter fertilizer with dibutyldithiophosphate was added to the soil in a furrow that connected the seeds that were planted. The planting and harvesting of the corn were performed using state-of-the-art field equipment designed for field trials. Six different plots were fertilized with each loading of dibutyldithiophosphate. Prior to planting the seeds, the soil was fertilized with NPK fertilizer at loadings for optimal growth of the corn. The corn was harvested and weighed; the results of the harvest yield are shown in FIG. 5.

Figure 5:
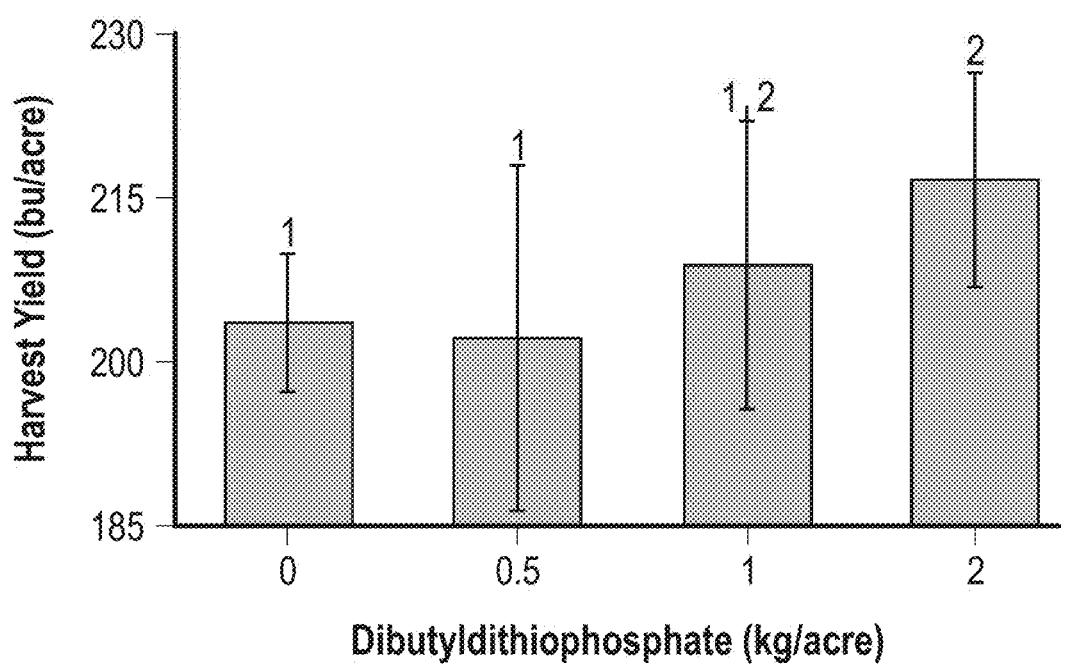
FIG. 5. The harvest yields of corn grown with different amounts of dibutyldithiophosphate added per acre are shown. The groups that labeled with different numbers were found to be statistically significant using the Tukey-Kramer test (Example 26).

The results shown in FIG. 5 demonstrate that dibutyldithiophosphate can increase the harvest weight of corn even when the dibutyldithiophosphate was only applied once. The biggest effect was observed with a loading of 2 kg/acre of dibutyldithiophosphate and resulted in a 6.4% increase (13.2 bushels per acre) for corn. The harvest yield at 2 kg per acre was higher than the harvest yield of corn grown without dibutyldithiophosphate at a 76% confidence level and at an 80% confidence level compared to the harvest yield at a loading of 0.5 kg of dibutyldithiophosphate per acre. Approximately 35,000 corn seeds were planted per acre, and a loading of 2.0 kg of dibutyldithiophosphate per acre equates to a dosing of 57 mg of dibutyldithiophosphate per seed. Since the dibutyldithiophosphate was continuously added to the soil in a line connecting the seeds, it is unlikely that each seed adsorbed the full 57 mg of dibutyldithiophosphate. These results demonstrate that the dithiophosphates at very low loadings can have large effects on the harvest yields of corn.

Example 27

Increased Harvest Yield of Soybeans using a Dithiophosphate

All essential plant nurtients (N, P, K, and S) were applied in non-limiting amounts. Prior to planting soybeans, the fields were fertilized with 60 lb acre of $P_2O_5$, 80 lb per acre of K20, and 20 lb per acre of sulfur. The soybean seeds were a 2.8-3.2 relative maturity planted at 120,000 to 140,000 seeds per acre. All field management were designed to effectively control weed and insect pests to optimize soybean growth and yield. The soybeans were planted and either 0, 0.5, 1.0, or 2.0 kg per acre of dibutyldithiophosphate was applied as a side dressing to the soybean plants. The dibutyldithiophosphate was dissolved in water and applied. The harvest weight was determined for each plot and corrected for slight differences in moisture content. The protein level, oil level, starch level, and density of the soybeans grown with 0 and 2 kg per acre of dibutyldithiophosphate were measured and found to be the same for both sets.

Figure 6:
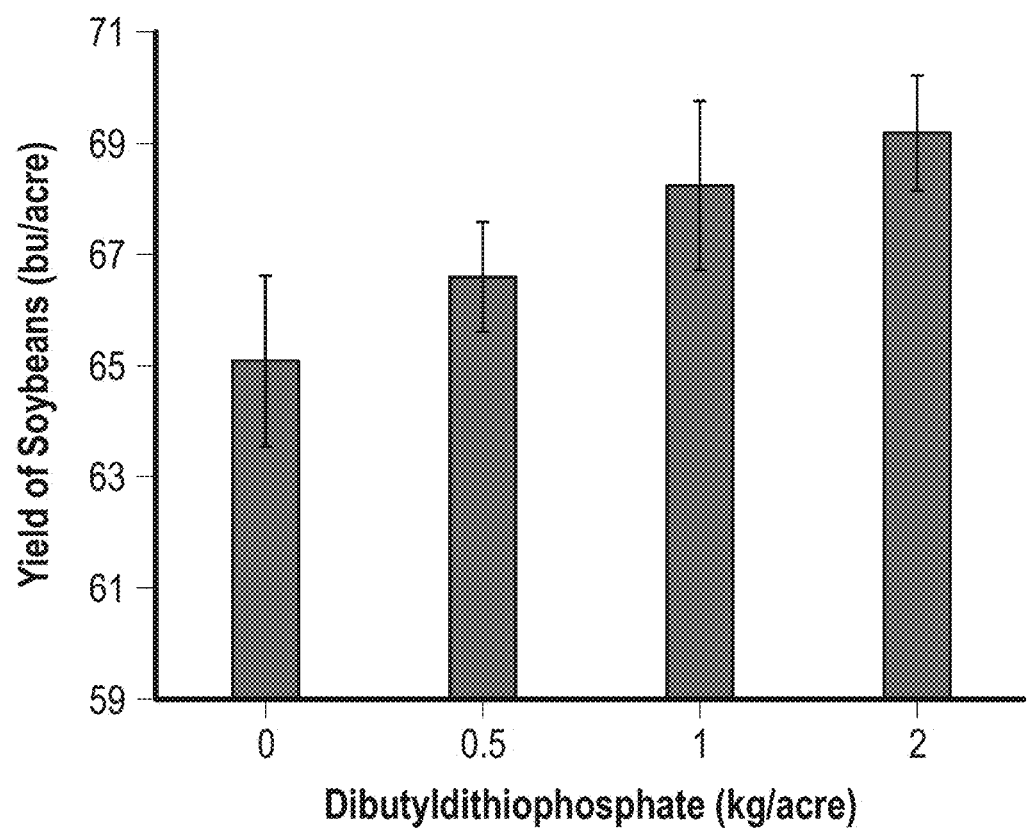
FIG. 6. The harvest yields of soybeans grown with different amounts of dibutyldithiophosphate added per acre are shown.

The results shown in FIG. 6 demonstrate that dithiophosphates can have a large, positive effect on the harvest yields of soybeans. Soybean plants exposed to 2 kg of dibutyldithiophosphate had an increase in harvest yield of 4.4% compared to soybean plants not exposed to dithiophosphates.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method comprising, increasing growth or harvest yield by providing $H_2S$ to a plant or a seed through degradation of a compound of formula I;

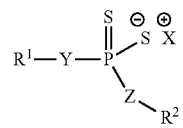

wherein:
Y is O;
Z is O;
$R^1$ is $C_3$-alkyl, $C_4$-alkyl, $C_5$-alkyl, $C_6$-alkyl, $C_7$-alkyl, $C_8$-alkyl, $C_9$-alkyl, or $C_{10}$-alkyl, and $R^2$ is $C_3$-alkyl, $C_4$-alkyl, $C_5$-alkyl, $C_6$-alkyl, $C_7$-alkyl, $C_8$-alkyl, $C_9$-alkyl, or $C_{10}$-alkyl, and
$X^+$ is a suitable cation
wherein the plant is a pea, lettuce, tomato, cucumber, green bean, broccoli, squash, beet, onion, sugar, corn, sugar beet, barley, oats, wheat, potato, soybean, or radish; and wherein the seed is a seed of a plant selected from the group consisting of pea, lettuce, tomato, cucumber, green bean, broccoli, squash, beet, onion, sugar, sugar beet, barley, oats, wheat, potato, corn, soybean, and radish.

2. The method of claim 1, wherein the growth or the harvest yield is increased by, contacting the plant with the compound of formula I.

3. The method of claim 1, wherein the growth or the harvest yield for a plant that grows from a seed is increased by contacting the seed with a compound as described in claim 1.

4. The method of claim 3, wherein the seed is contacted with the compound prior to planting.

5. The method of claim 1, wherein the growth or the harvest yield of the plant is increased by allowing the compound of formula I to degrade on or near the plant, or on or near a seed of the plant, so that $H_2S$ is provided to the plant or to the seed.

6. The method of claim 1, wherein the compound is applied to soil wherein the plant or a seed of the plant has been planted or will be planted.

7. The method of claim 1, wherein the compound releases $H_2S$ over a period of at least 7 days after contacting or applying.

8. The method of claim 1, wherein the compound releases $H_2S$ over a period of at least 1 year after contacting or applying.

9. The method of claim 1, wherein the compound is selected from the group consisting of:

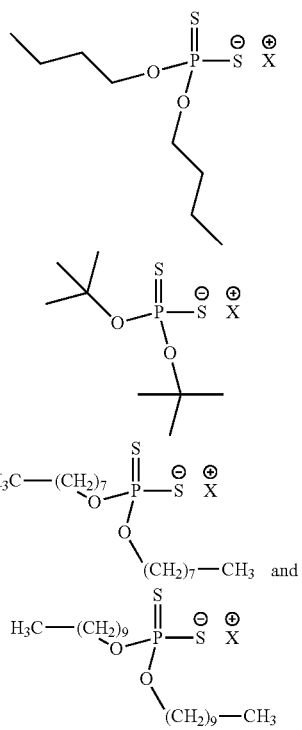

wherein $X^+$ is a suitable cation.

10. The method of claim 1, wherein $X^+$ is potassium, sodium, or triethyl ammonium.

11. The method of claim 1, wherein $X^+$ is potassium or sodium.

12. The method of claim 1, wherein $X^+$ is triethyl ammonium.

13. The method of claim 1, wherein $X^+$ is an ammonium cation.

14. A method comprising, increasing growth or harvest yield by providing $H_2S$ to a plant or a seed through degradation of a compound of formula:

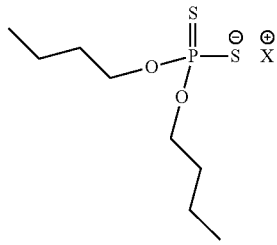

wherein $X^+$ is a suitable cation;
wherein the plant is a pea, lettuce, tomato, cucumber, green bean, broccoli, squash, beet, onion, sugar, corn, sugar beet, barley, oats, wheat, potato, soybean, or radish; and
wherein the seed is a seed of a plant selected from the group consisting of pea, lettuce, tomato, cucumber, green bean, broccoli, squash, beet, onion, sugar, corn, sugar beet, barley, oats, wheat, potato, soybean, and radish.

15. A method comprising, increasing growth or harvest yield by providing $H_2S$ to a plant or a seed through degradation of a compound of formula:

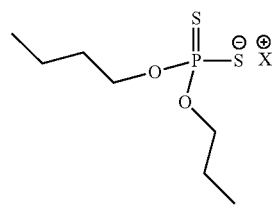

wherein $X^+$ is a suitable cation;
wherein the plant is a corn or soybean; and
wherein the seed is a seed of a plant selected from the group consisting of a corn and a soybean.

16. A method comprising, increasing harvest yield by providing $H_2S$ to a plant or a seed through degradation of a compound of formula:

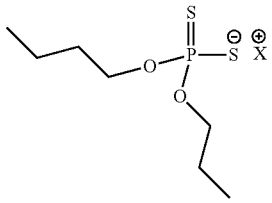

wherein $X^+$ is a suitable cation;
wherein the plant is a pea, lettuce, tomato, cucumber, green bean, broccoli, squash, beet, onion, sugar, corn, sugar beet, barley, oats, wheat, potato, radish, or soybean; and wherein the seed is a seed of a plant selected from the group consisting of pea, lettuce, tomato, cucumber, green bean, broccoli, squash, beet, onion, sugar, corn, sugar beet, barley, oats, wheat, potato, soybean, and radish.

17. A method for increasing the harvest yield of a plant comprising, contacting the plant with a compound of formula:

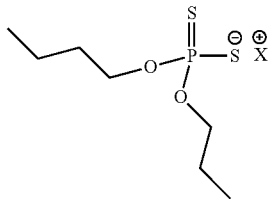

wherein X⁺ is a suitable cation;
wherein the plant is a pea, lettuce, tomato, cucumber, green bean, broccoli, squash, beet, onion, sugar, corn, sugar beet, barley, oats, wheat, potato, soybean, or radish.

18. A method for increasing the harvest yield of a plant that grows from a seed, comprising contacting the seed with a compound of formula:

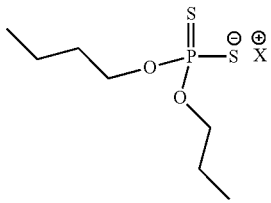

wherein X⁺ is a suitable cation;
wherein the plant is a pea, lettuce, tomato, cucumber, green bean, broccoli, squash, beet, onion, sugar, corn, sugar beet, barley, oats, wheat, potato, soybean, or radish.

* * * * *